US012435454B2

(12) United States Patent
Atwal et al.

(10) Patent No.: US 12,435,454 B2
(45) Date of Patent: Oct. 7, 2025

(54) METHOD FOR NONWOVEN TEXTILES WITH VARIABLE ZONAL PROPERTIES

(71) Applicant: NIKE, Inc., Beaverton, OR (US)

(72) Inventors: Balwant S. Atwal, Hillsboro, OR (US); Daniel Morgan, Beaverton, OR (US); Will Stark, Portland, OR (US); Patrick Williams, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 488 days.

(21) Appl. No.: 17/671,140

(22) Filed: Feb. 14, 2022

(65) Prior Publication Data
US 2022/0162787 A1 May 26, 2022

Related U.S. Application Data

(62) Division of application No. 16/391,163, filed on Apr. 22, 2019, now Pat. No. 11,248,322.
(Continued)

(51) Int. Cl.
*D04H 1/04* (2012.01)
*B32B 5/02* (2006.01)
(Continued)

(52) U.S. Cl.
CPC .............. *D04H 1/74* (2013.01); *B32B 5/022* (2013.01); *B32B 5/10* (2013.01); *B32B 5/12* (2013.01); *D04H 1/04* (2013.01); *D04H 1/10* (2013.01); *D04H 1/16* (2013.01); *D04H 1/20* (2013.01); *D04H 1/32* (2013.01); *D04H 1/4374* (2013.01); *D04H 1/46* (2013.01); *D04H 1/52* (2013.01); *D04H 5/00* (2013.01); *D04H 5/02* (2013.01);
(Continued)

(58) Field of Classification Search
None
See application file for complete search history.

(56) References Cited

U.S. PATENT DOCUMENTS 2,158,533 A * 5/1939 Cavey .................... D04H 1/498
28/112
2,381,184 A * 8/1945 Ripley ..................... D04H 1/74
428/125
(Continued)

FOREIGN PATENT DOCUMENTS

CN 102250479 A * 11/2011
DE 2436539 A * 2/1976 ............. D04H 1/542
(Continued)

OTHER PUBLICATIONS

Google Translation of SU-755914-A1, Aug. 1980 (Year: 1980).*
(Continued)

*Primary Examiner* — Jeffrey A Vonch
(74) *Attorney, Agent, or Firm* — SHOOK, HARDY & BACON L.L.P.

(57) ABSTRACT

Methods and systems are provided for a process to generate a nonwoven textile. In one example, the nonwoven textile may have layered, zonal properties resulting from entangling of two or more types of staple fibers through a merging region between the layers of staple fibers while maintaining distinct zones, each zone comprising a type of staple fiber. Furthermore, the process may include embedding a filament layer into the nonwoven textile via a continuous assembly line.

20 Claims, 8 Drawing Sheets

Related U.S. Application Data

(60) Provisional application No. 62/677,553, filed on May 29, 2018.

(51) Int. Cl.

| | | |
|---|---|---|
| *B32B 5/10* | (2006.01) | |
| *B32B 5/12* | (2006.01) | |
| *D04H 1/10* | (2006.01) | |
| *D04H 1/16* | (2006.01) | |
| *D04H 1/20* | (2006.01) | |
| *D04H 1/32* | (2012.01) | |
| *D04H 1/4374* | (2012.01) | |
| *D04H 1/46* | (2012.01) | |
| *D04H 1/52* | (2006.01) | |
| *D04H 1/74* | (2006.01) | |
| *D04H 5/00* | (2012.01) | |
| *D04H 5/02* | (2012.01) | |
| *D04H 5/04* | (2006.01) | |
| *D04H 5/08* | (2012.01) | |
| *B32B 5/06* | (2006.01) | |
| *B32B 5/08* | (2006.01) | |
| *B32B 5/14* | (2006.01) | |
| *B32B 5/24* | (2006.01) | |
| *B32B 7/022* | (2019.01) | |
| *B32B 7/027* | (2019.01) | |
| *B32B 27/02* | (2006.01) | |
| *D01G 15/02* | (2006.01) | |
| *D01G 15/70* | (2006.01) | |
| *D01G 25/00* | (2006.01) | |
| *D04H 1/488* | (2012.01) | |
| *D04H 1/498* | (2012.01) | |
| *D04H 1/542* | (2012.01) | |
| *D04H 1/559* | (2012.01) | |

(52) U.S. Cl.
CPC ............... D04H 5/04 (2013.01); D04H 5/08 (2013.01); *B32B 5/06* (2013.01); *B32B 5/08* (2013.01); *B32B 5/145* (2013.01); *B32B 5/24* (2013.01); *B32B 7/022* (2019.01); *B32B 7/027* (2019.01); *B32B 27/02* (2013.01); *B32B 2262/02* (2013.01); *B32B 2262/144* (2021.05); *B32B 2437/02* (2013.01); *D01G 15/02* (2013.01); *D01G 15/70* (2013.01); *D01G 25/00* (2013.01); *D04H 1/488* (2013.01); *D04H 1/498* (2013.01); *D04H 1/542* (2013.01); *D04H 1/559* (2013.01); *D10B 2401/04* (2013.01); *D10B 2501/043* (2013.01); *Y10T 428/24132* (2015.01); *Y10T 428/24628* (2015.01); *Y10T 428/24942* (2015.01); *Y10T 442/56* (2015.04); *Y10T 442/59* (2015.04); *Y10T 442/643* (2015.04); *Y10T 442/682* (2015.04); *Y10T 442/684* (2015.04); *Y10T 442/688* (2015.04)

(56) References Cited

U.S. PATENT DOCUMENTS

| | | | | |
|---|---|---|---|---|
| 2,647,297 A | * | 8/1953 | Battista | D04H 1/00 28/103 |
| 2,835,020 A | * | 5/1958 | Doe | D04H 1/16 442/326 |
| 2,927,350 A | | 3/1960 | Nelson | |
| 2,933,774 A | | 4/1960 | Adams, Jr. | |
| 3,019,147 A | * | 1/1962 | Nalle, Jr. | B29C 48/09 428/36.1 |
| 3,097,413 A | | 7/1963 | Draper, Jr. | |
| 3,152,382 A | * | 10/1964 | Huchler | D04H 1/22 28/122 |
| 3,206,351 A | * | 9/1965 | Smith, II | D04H 1/4374 428/113 |
| 3,257,259 A | | 6/1966 | Law | |
| 3,260,640 A | | 7/1966 | Owen | |
| 3,523,059 A | | 8/1970 | Coates | |
| 3,601,873 A | | 8/1971 | Williams | |
| 3,615,989 A | | 10/1971 | Depoe | |
| 3,616,037 A | | 10/1971 | Burger | |
| 3,616,124 A | * | 10/1971 | Danhel | D04H 1/498 428/187 |
| 3,719,546 A | | 3/1973 | Parlin | |
| 3,740,282 A | | 6/1973 | Watson | |
| 3,817,820 A | * | 6/1974 | Smith, II | B32B 27/12 428/401 |
| 3,849,223 A | | 11/1974 | Kent | |
| 3,879,820 A | | 4/1975 | Grieves et al. | |
| 4,039,711 A | * | 8/1977 | Newman | D04H 5/06 442/382 |
| 4,042,655 A | | 8/1977 | Platt et al. | |
| 4,132,821 A | * | 1/1979 | Hiers | D06N 3/0002 428/218 |
| 4,144,370 A | * | 3/1979 | Boulton | B32B 5/024 28/103 |
| 4,170,676 A | | 10/1979 | Thomas | |
| 4,241,123 A | * | 12/1980 | Shih | B29C 48/13 156/181 |
| 4,287,246 A | * | 9/1981 | Thornton | B32B 5/12 428/113 |
| 4,656,075 A | * | 4/1987 | Mudge | B29C 48/05 428/36.1 |
| 4,722,857 A | * | 2/1988 | Tomioka | D04H 5/06 156/181 |
| 4,880,420 A | * | 11/1989 | Pomparelli | A61F 13/49009 604/385.27 |
| 4,910,064 A | | 3/1990 | Sabee | |
| 4,916,782 A | * | 4/1990 | Caldwell | D04H 1/46 428/113 |
| 4,926,570 A | * | 5/1990 | Fohst | A43B 17/006 36/43 |
| 4,984,772 A | | 1/1991 | Freund | |
| 5,200,246 A | * | 4/1993 | Sabee | D04H 5/06 428/113 |
| 5,329,680 A | * | 7/1994 | Manne | D04H 1/46 28/163 |
| 5,396,689 A | | 3/1995 | Vuillaume | |
| 5,691,029 A | * | 11/1997 | Lucas | D04H 3/04 442/364 |
| 5,741,380 A | | 4/1998 | Hoyle et al. | |
| 2001/0041484 A1 | * | 11/2001 | Schwinn | B32B 5/26 442/57 |
| 2002/0106956 A1 | | 8/2002 | Howland | |
| 2002/0119722 A1 | * | 8/2002 | Welch | A61F 13/15593 442/329 |
| 2002/0124367 A1 | | 9/2002 | Wong | |
| 2002/0177376 A1 | * | 11/2002 | Welch | D04H 3/04 442/50 |
| 2004/0166756 A1 | * | 8/2004 | Kurihara | B29C 55/20 442/366 |
| 2004/0253888 A1 | * | 12/2004 | Iedema | D04H 1/5412 442/59 |
| 2005/0095942 A1 | * | 5/2005 | Mueller | A61F 13/15203 442/366 |
| 2005/0255776 A1 | | 11/2005 | Howland | |
| 2008/0124993 A1 | | 5/2008 | Brady | |
| 2008/0166532 A1 | * | 7/2008 | Tsiarkezos | A47C 27/002 112/475.01 |
| 2009/0017711 A1 | * | 1/2009 | Dilo | D04H 18/00 442/402 |
| 2009/0217498 A1 | * | 9/2009 | Dos Santos | D04H 1/482 28/115 |
| 2010/0239817 A1 | * | 9/2010 | Makimura | D06N 3/0013 427/389.9 |
| 2011/0034100 A1 | | 2/2011 | Narayanan et al. | |
| 2011/0123775 A1 | * | 5/2011 | Westwood | D01D 4/025 428/172 |

(56) References Cited

U.S. PATENT DOCUMENTS

| | | | |
|---|---|---|---|
| 2011/0250420 A1 | 10/2011 | Kalde | |
| 2012/0322333 A1* | 12/2012 | Melamed | B05D 1/14 |
| | | | 442/415 |
| 2013/0059116 A1* | 3/2013 | Peikert | A43B 13/12 |
| | | | 36/25 R |
| 2013/0198998 A1 | 8/2013 | Kuhn et al. | |
| 2014/0234606 A1* | 8/2014 | Ausen | D01D 4/02 |
| | | | 264/177.1 |
| 2016/0002838 A1* | 1/2016 | Ausen | B29C 48/307 |
| | | | 442/50 |
| 2016/0362824 A1* | 12/2016 | Ausen | D04H 3/163 |
| 2017/0305055 A1* | 10/2017 | Ausen | B29C 48/11 |
| 2019/0345656 A1* | 11/2019 | Dua | A43B 23/0255 |
| 2019/0366680 A1* | 12/2019 | Dua | B32B 5/024 |
| 2019/0368089 A1 | 12/2019 | Atwal et al. | |
| 2019/0368091 A1 | 12/2019 | Atwal et al. | |

FOREIGN PATENT DOCUMENTS

| | | | | |
|---|---|---|---|---|
| DE | 19647458 A1 | * | 5/1998 | B32B 5/26 |
| DE | 202009011419 U1 | * | 1/2010 | A41C 3/14 |
| EP | 369046 A | * | 5/1990 | A41D 27/06 |
| EP | 0492432 A1 | | 7/1992 | |
| EP | 0679748 A2 | | 11/1995 | |
| EP | 1065047 A1 | * | 1/2001 | A61F 13/539 |
| EP | 1473396 A2 | * | 11/2004 | A43B 1/00 |
| EP | 1547553 A2 | * | 6/2005 | A61F 13/15609 |
| EP | 1900863 A1 | * | 3/2008 | D01G 15/46 |
| FR | 2566437 A | * | 12/1985 | D04H 1/413 |
| FR | 2883303 A1 | | 9/2006 | |
| GB | 897782 A | * | 5/1962 | |
| GB | 1099594 A | * | 1/1968 | |
| GB | 1490116 A | * | 10/1977 | B01D 39/1607 |
| GB | 1495564 A | | 12/1977 | |
| GB | 2122542 A | * | 1/1984 | A41D 27/06 |
| GB | 2264511 A | | 9/1993 | |
| JP | 04034034 A | * | 2/1992 | |
| JP | 2001009947 A | * | 1/2001 | B29C 43/28 |
| SU | 755914 A1 | * | 8/1980 | |
| TW | M502702 U | * | 6/2015 | |
| WO | WO-9216361 A1 | * | 10/1992 | D04H 1/56 |
| WO | WO-9922060 A1 | * | 5/1999 | A43B 23/086 |
| WO | WO-0248460 A1 | * | 6/2002 | A43B 1/06 |
| WO | 02/095111 A1 | | 11/2002 | |
| WO | 2009/126793 A1 | | 10/2009 | |
| WO | WO-2012049457 A1 | * | 4/2012 | D04H 1/46 |

OTHER PUBLICATIONS

Machine Translation of JP-04034034-A, Feb. 1992 (Year: 1992).*

Align, Definition of Align at Dictionary.com, www.dictionary.com/browse/align, Jun. 30, 2021, 6 pages.

Complete Textile Glossary, Celanese Acetate LLC, 2001, 5 pages.

Final Office action received for U.S. Appl. No. 16/391,189, mailed on Apr. 18, 2022, 9 pages.

Non-Final Office action received for U.S. Appl. No. 16/391,189, mailed on Feb. 24, 2023, 13 pages.

Final Office Action received for U.S. Appl. No. 16/391,189, mailed on Oct. 12, 2023, 11 Pages.

Non-Final Office Action received for U.S. Appl. No. 16/391,189, mailed on Jan. 30, 2025, 11 pages.

\* cited by examiner

METHOD FOR NONWOVEN TEXTILES WITH VARIABLE ZONAL PROPERTIES

CROSS REFERENCE TO RELATED APPLICATIONS

This application is a divisional application of co-pending U.S. application Ser. No. 16/391,163, entitled, "METHOD FOR NONWOVEN TEXTILES WITH VARIABLE ZONAL PROPERTIES," and filed Apr. 22, 2019, which claims priority to U.S. Provisional Patent Application No. 62/677,553, entitled "METHOD FOR NONWOVEN TEXTILES WITH VARIABLE ZONAL PROPERTIES," and filed on May 29, 2018. The entire contents of the aforementioned applications are incorporated herein by reference herein.

FIELD

The present description relates generally to methods and systems for generating a multi-zoned nonwoven textile.

BACKGROUND

Nonwoven textiles are engineered materials formed from webs of fibers where the fibers are interlocked by a mechanical, thermal, or chemical method. The manufactured nonwoven fabrics may possess a wide range of physical properties including porosity, durability, stretch, strength, thermal insulation, etc.

SUMMARY

A combining of two or more properties into a single textile may be desired but a continuous material with two distinct bonded layers, or zones, of fibers cannot be generated in-line by conventional fabrication methods. Instead, the zones may be individually constructed and then combined into a single sheet by an off-line process such as adhesive attachment. As a result, throughput may be decreased while manufacturing costs may be raised.

In one example, a textile with distinct zonal properties is generated by enmeshing and cross-lapping different fibers before they are felted together. The resulting textile may have distinct properties on the upper surface, lower surface, and intermediate layer. The textile can be generated via a single in-line production process.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
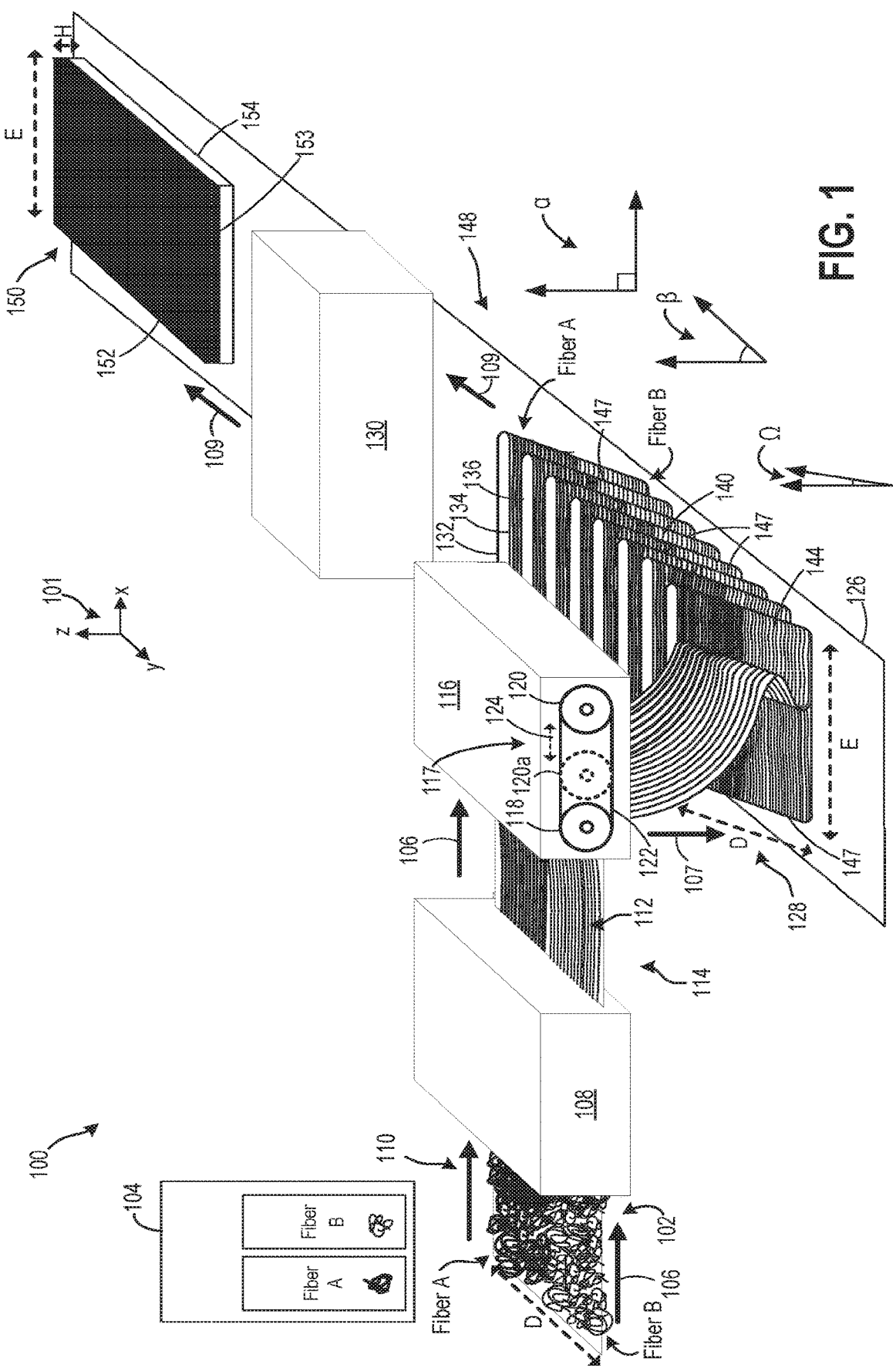
FIG. 1 shows a process for forming a nonwoven textile with zonal properties by incorporation of at least two types of staple fibers into the textile.
Figure 2:
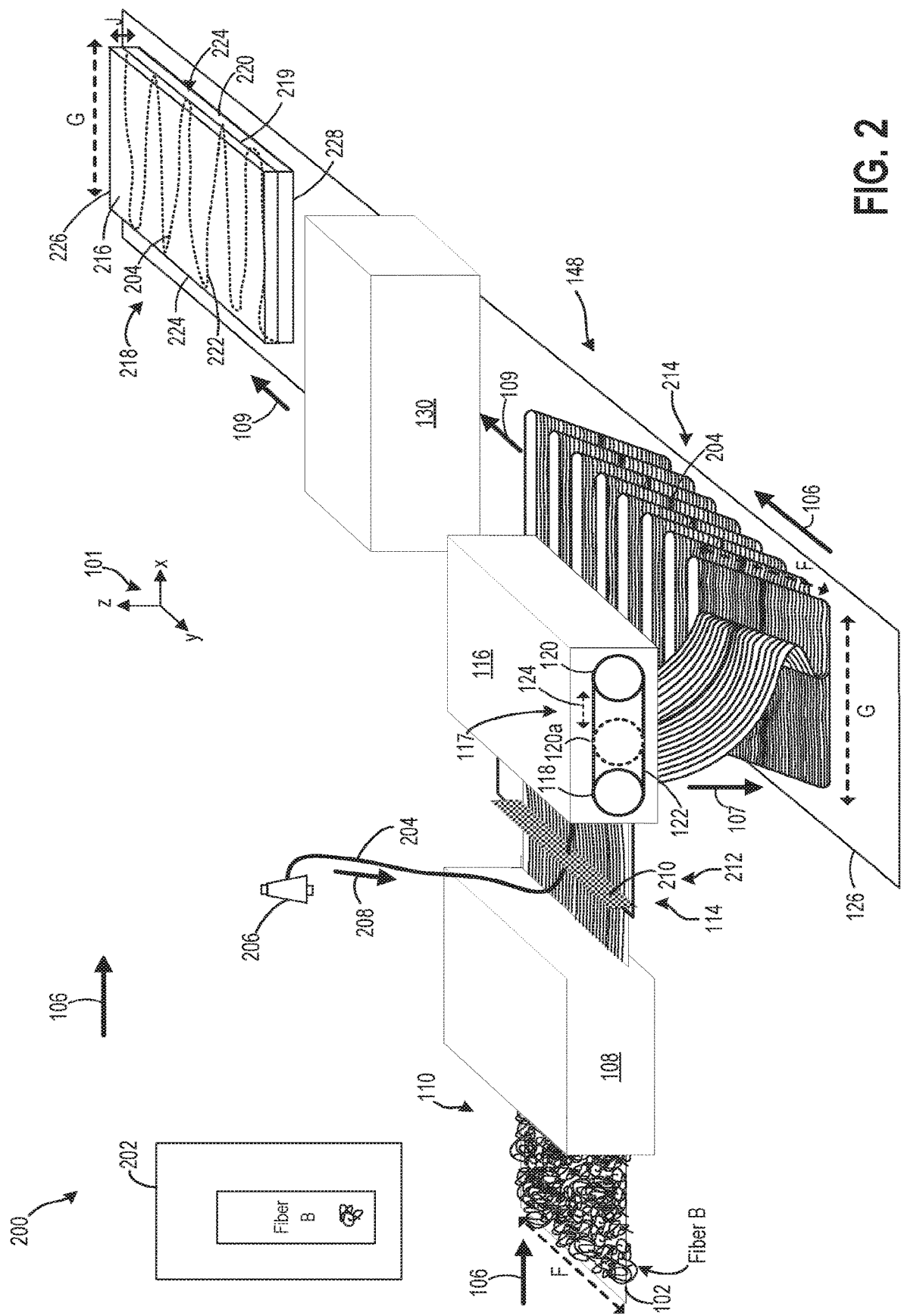
FIG. 2 shows a process for forming a nonwoven textile from a staple fiber that is reinforced by a filament.
Figure 3:
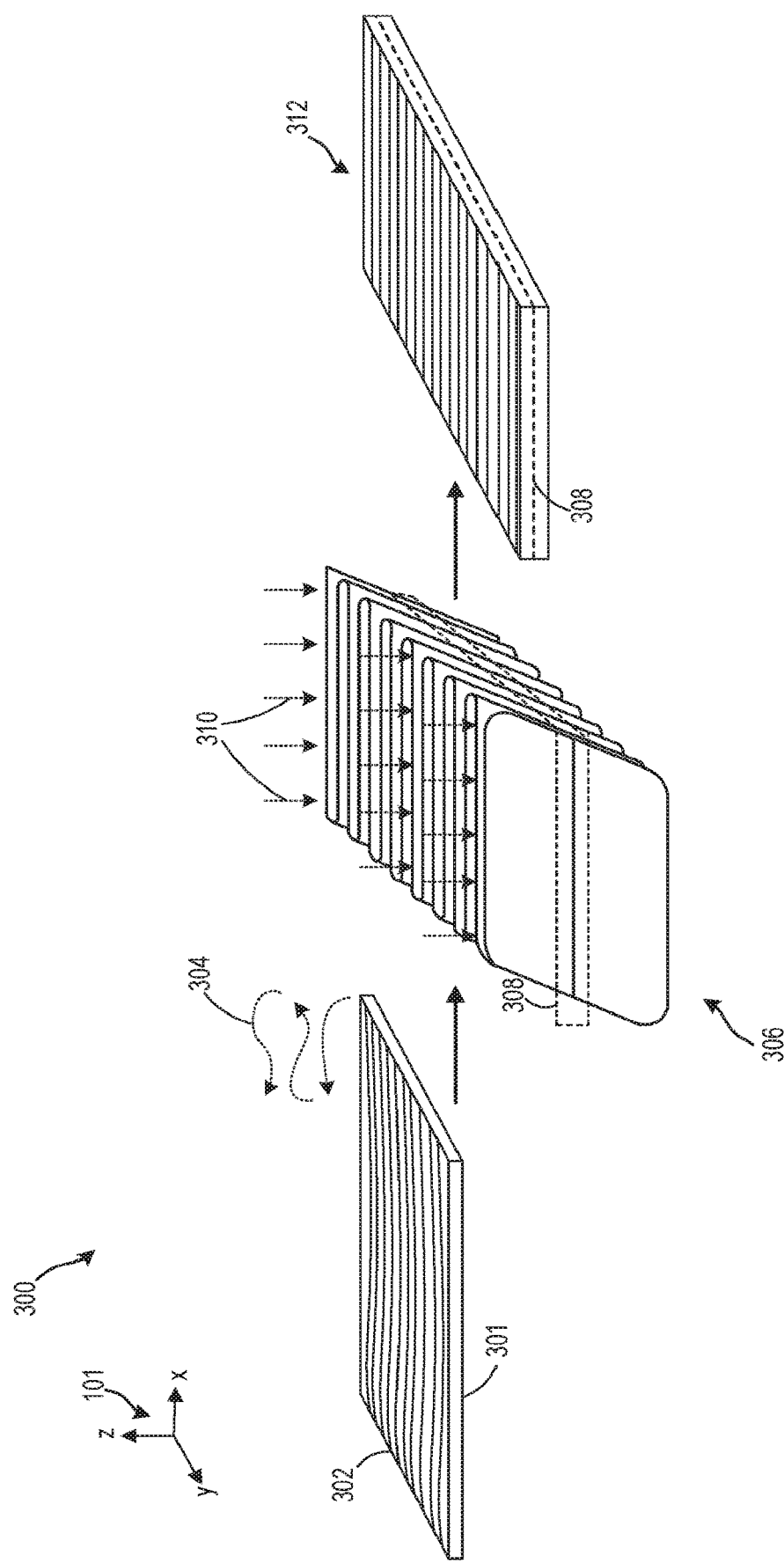
FIG. 3 is a schematic diagram showing an orientation of a carded sheet of staple fiber(s) during cross-lapping, indicating a direction of movement and forces exerted on the carded sheet.
Figure 4:
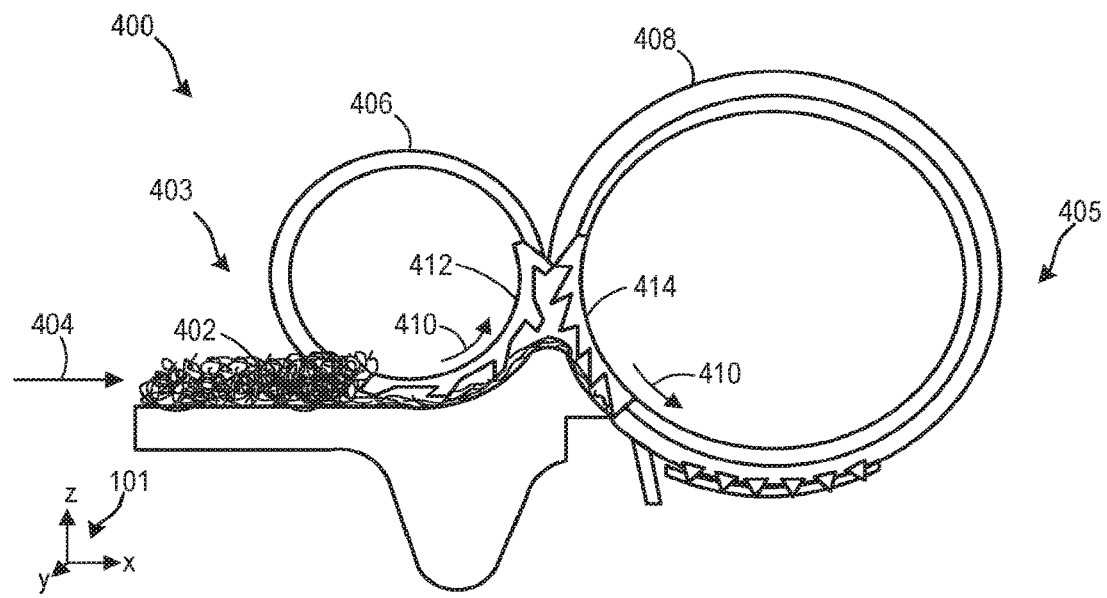
FIG. 4 is an example of a carding machine used in the process of forming a nonwoven textile.
Figure 5:
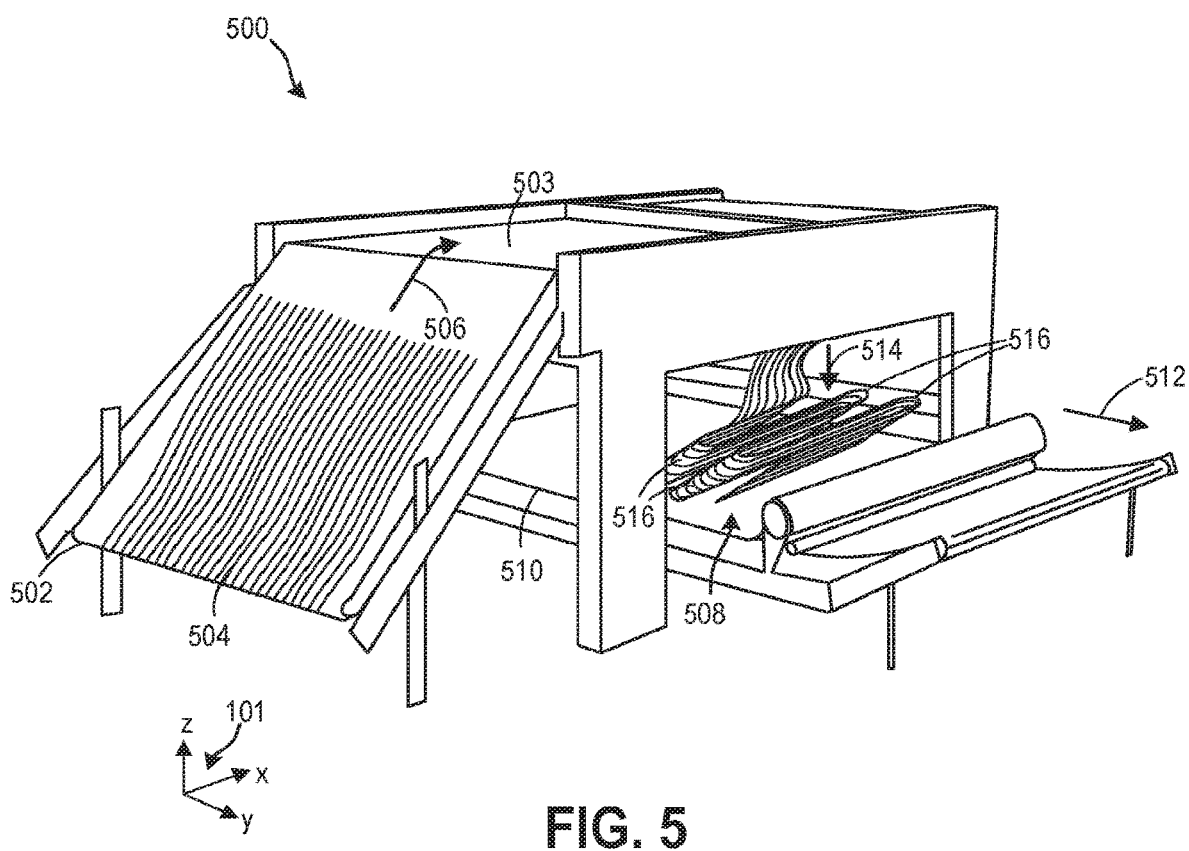
FIG. 5 is an example of a cross-lapper used in the process of forming a nonwoven textile.
Figure 6:
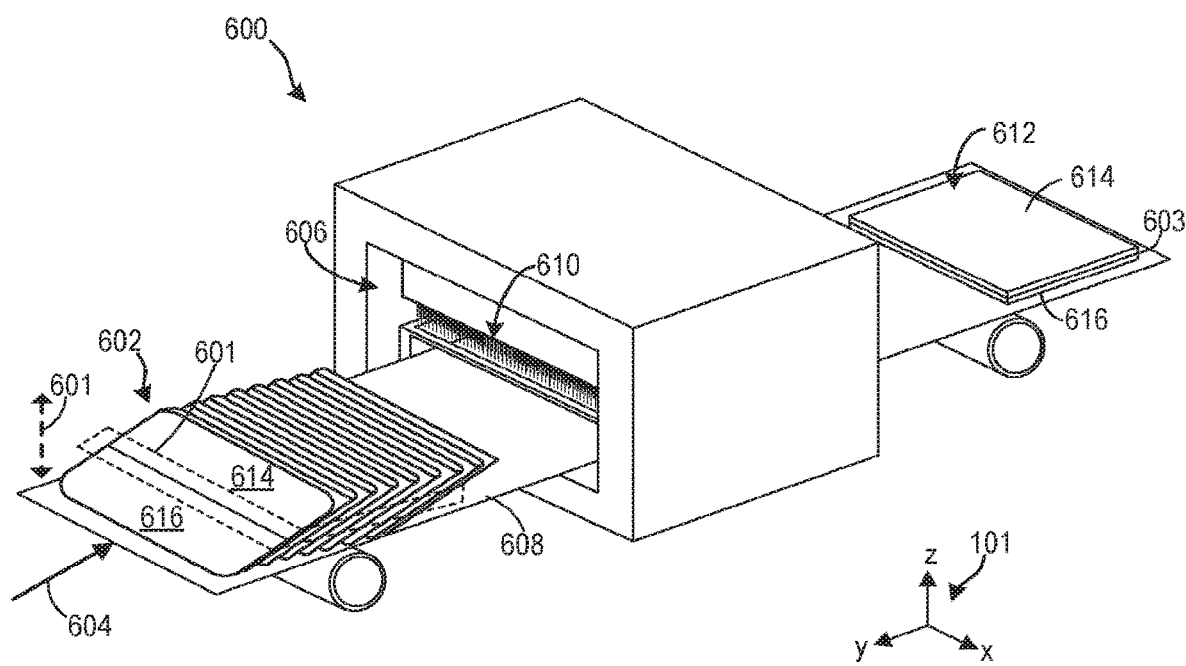
FIG. 6 is an example of a needle felting machine used in the process of forming a nonwoven textile.

Nonwoven textiles, and methods for generating such textiles, are described herein. An assembly line that includes elements and operations included in the process for forming a nonwoven textile with layered, zonal properties is illustrated in FIG. 1. An alternate process for individual carding of a first and a second staple fiber included into a layered nonwoven textile is shown in FIG. 9. A similar assembly line is shown in FIG. 2, depicting a process for generating a nonwoven textile with an embedded layer of a continuous fiber, or filament. Changes in an orientation and dimensions of a staple fiber web during the processes shown in FIGS. 1 and 2 is elaborated in the schematic diagram of FIG. 3. FIGS. 4-6 show examples of a carding machine, a cross-lapper, and a needle felting machine that may be used in the processes for fabricating nonwoven textiles, such as the processes illustrated in FIGS. 1 and 2. Example routines for the processes of FIGS. 1, 2, and 9 are described in FIGS. 7 and 8 respectively, resulting in generation of a multi-layered nonwoven textile, each layer having distinct properties, and a nonwoven textile that is reinforced with a filament.

Nonwoven textiles are engineered materials formed from webs of fibers where the fibers are interlocked by a mechanical, thermal, or chemical method. Manufacturing costs of nonwoven textiles are lower than those of fabrics that are spun, woven, or knitted and sheets of nonwoven textiles may be formed by processing staple fibers and/or filament fibers. The manufactured nonwoven fabrics may possess a wide range of physical properties including variable porosity, durability, stretch, strength, thermal insulation, etc.

Nonwoven textiles include sheets, webs, or batts of natural or synthetic fibers that may be bonded together by different processes. Such textiles may be used in a wide range of applications including linings for apparel, footwear, materials for filters and insulation, medical supplies such as bandages, and numerous other products. Furthermore, the manufacturing of nonwoven textiles provides alternatives to woven fabrics.

At least a portion of a nonwoven textile may be composed of staple fibers, which may be fibers of discrete length that may be of a natural type, such as wool, or of a synthetic type, such as polyester. The type of staple fiber used in the manufacture of a nonwoven textile may be chosen based on properties of the staple fiber such as absorbency, flame retardancy, softness, thermal insulation, stretch, use as a bacterial barrier, etc., and further based on the desired properties of the textile. While mixing of different types of staple fibers into a unitary nonwoven textile is achieved by conventional manufacturing processes, formation of a nonwoven textile with distinct zones, where the zones are distributed along a thickness of the textile and each zone comprises a type of staple fiber, may impose additional operations to the manufacturing process and thus increase production costs while decreasing an efficiency of throughput.

In addition, in spite of the diversity of properties that may be imparted to nonwoven textiles based on the type of staple fiber used, in fabrics formed from staple fibers alone, the strength of the nonwoven textile, e.g., resistance to rupture, may not match a strength possessed by woven fabrics. Reinforcement of the nonwoven textile by a filament may be desired. Conventional methods for incorporating the filament into the structure of the nonwoven textile, however, may involve off-line processing methods that increase costs and decrease production throughput.

In some examples, the nonwoven textile may be configured to have desired zonal properties, arising from segregation of different staple fiber types into each zone, yet remain a continuous fabric by coupling the zones through a merging zone disposed between the zones. For example, a first zone forming an upper layer of the nonwoven textile may be thermally insulating while a second zone forming a bottom layer of the textile may repel liquids. In another example, the first zone may have a lower melting point, e.g., due to inclusion of a low melt polymer, than the second zone. The lower melting point of the first zone may allow the first zone to shrink at a faster rate, upon exposure to heat, than the second zone, biasing a bending of the textile and providing the textile with a desired curvature. The merging zone between the first and second zones may be a layer of adhesive when produced via conventional processes. Adhering the first and second zones together may involve an additional process that is not included in the on-line production method, thus increasing a time for generation of the final nonwoven textile.

In another example, incorporation of a continuous filament into a nonwoven textile formed from staple fibers may be desired. The continuous filament may be a fiber of indiscrete or infinite length and may be a natural or synthetic material. Incorporation of the filament into a structure of the nonwoven textile as a distinct layer may allow the textile to have a desired visual pattern, coloring, or texture. The pattern generated by the filament may impart a specific physical property, e.g., rigidity or pliability, to the layer or zone where it is incorporated, as well as affecting an overall physical property of the textile. Furthermore, the filament may be a low melt polymer that affects a curling of the textile when heated. As well, the filament may reinforce a property of the staple fiber, such as increasing a strength or elasticity of the nonwoven textile. However, integration of the filament into a web of staple fibers may not be achieved by a single continuous process, according to conventional methods of manufacture, resulting in additional processing steps that may reduce a production efficiency and incur additional costs.

The nonwoven textiles and methods for generation of the nonwoven textiles described herein overcome at least some of the aforementioned challenges. The systems and methods described herein include aligning different types of staple fibers in an orientation that maintains distinct zones of each type of staple fiber in the nonwoven textiles formed. The systems and methods also include positioning the continuous filament relative to the staple fibers to form a layer of the filament embedded within the staple fibers of the nonwoven textiles.

In one example, a method is provided that includes generating a web with a first and a second staple fiber, which in one example may be staple fibers of a first type and a second type, at least partially aligned to each other and pleating the web along a first axis while moving the pleated web along a second axis, offset from the first axis. In such an example, the staple fibers may be arranged in a common plane and carded while travelling along a first axis into a first web and then pleated by cross-lapping along the first axis into a second web. During pleating, the first web may be moved along the second axis so that the pleated second web is generated at an angle relative to the first axis. The second web may be felted while moving along the second axis to form the nonwoven textile with the first type of staple fibers on a top surface and the second type of staple fibers on a bottom surface of the textile.

In another example, a method includes generating a web with a staple fiber and a continuous filament at least partially aligned to each other and pleating the web along a first axis while moving the pleated web along a second axis, offset from the first axis. The method may undergo similar steps to the example described above and may further include initially threading the filament along the first axis to form a first carded web. The filament may be pleated along with the staple fiber to form an angled second web which may be felted to generate a textile with the filament positioned in between a top surface and a bottom surface of the textile.

A process 100 for generating a nonwoven textile with layered zonal properties is illustrated in FIG. 1. The process 100 includes a carding step, a cross-lapping step, and a felting step, and will be described in the order that the steps occur to produce the nonwoven textile. A moving first conveyor belt 102 may be a transport mechanism for moving raw materials of the nonwoven textile between machine components of the process 100. A set of reference axes 101 are provided for comparison of views shown, indicating a y-direction, x-direction, and z-direction. In one example, the y-direction may align with a lateral direction, the −x direction with a horizontal direction, and the z-direction with a vertical direction. However, other orientations have been contemplated.

Two different staple fibers, herein depicted as two types of staple fibers, a first staple fiber A and a second staple fiber B, may be stored in individual compartments within common staple fiber bin 104. Fiber A and fiber B may be staple fibers formed from materials with different physical properties, such as from a natural or a synthetic fiber. Additionally or optionally, the first and second fiber may have different lengths, textures, melting points, or colors. There may be still other differences in physical properties between the first and second fibers.

Fiber A and fiber B may be transferred from the staple fiber bin 104 to the first conveyor belt 102 and arranged on a surface of the first conveyor belt 102 that is co-planar the x-y plane. The different types of fibers may be positioned adjacent to one another along the y-direction which is perpendicular to the direction of travel along the x-direction, as indicated by arrows 106. For example, when viewed along the x-direction towards a carding machine 108, along the direction of travel, fiber A and fiber B may be arranged in a left-to-right alignment in the x-y plane on the first conveyor belt 102, with a width D defining a distance between an outside edge (e.g., left-hand edge) of fiber A and an outside edge (e.g., right-hand edge) of fiber B.

The location of each type of staple fiber in the x-y plane may be selected based on a desired set of properties to be provided to the final nonwoven textile. For example, when fiber A is biased towards the left side of the x-y plane (and of fiber B) on the first conveyor belt, when entering the carding machine, as shown in FIG. 1, the nonwoven textile may be generated with fiber A as a top layer, e.g., stacked above fiber B, and fiber B as a bottom layer, e.g., stacked below fiber A. In one example, when the nonwoven textile is desired with waterproof properties on the top surface and water wicking properties on the bottom surface, the staple fibers may be inserted into the carding machine with the staple fibers of the waterproofing material arranged on the left side of the x-y plane, and the staple fibers of the water-wicking material arranged on the right side of the x-y plane. In other words, as shown in FIG. 1, fiber A may be the waterproof material and fiber B may be the water wicking material.

Furthermore, a ratio of the amount of a first fiber relative to the amount of a second fiber along the x-y carding plane may also affect textile properties. For example, a thickness of the waterproof layer relative to the water-wicking layer of the textile can be varied by adjusting portions of the width D attributed to each type of fiber. As an example, in FIG. 1, 50% of the width D may comprise fiber A while the other 50% of the width D is formed from fiber B. To increase the thickness of the waterproof layer (fiber A), the proportioning of the width D may be adjusted to 70% fiber A and 30% fiber B.

In addition to enabling distinct zonal properties to be provided to the top and bottom surface of the nonwoven textile as a single in-line production approach, the left to right ordering of the staple fibers may be particularly useful when more than two types of staple fibers are incorporated into the nonwoven textile. Therein, the arrangement enables a specific property to be imparted to a central layer of the textile versus the outer layers of the textile. For example, a third staple fiber or filament may be arranged in the middle of the x-y plane, between fiber A and fiber B along the first conveyor belt 102, to increase a tensile strength of the nonwoven textile.

A positioning of fiber A and fiber B on the first conveyor belt 102 before the carding machine 108 may be referred to herein as a first, pre-carding, zone 110. In the first zone 110, the first conveyor belt 102 moves along the direction indicated by arrows 106, thus conveying fiber A and fiber B simultaneously along the same direction towards the carding machine 108. The first conveyor belt 102 may be configured to extend continuously into, through, and out of the carding machine 108. The fibers may enter the carding machine 108 through an inlet opening of the carding machine 108 and travel continuously through the carding machine 108 while operations carried out by the carding machine 108 are performed on the fibers. Carding machine operations are described at FIG. 3 and briefly include disentangling staple fiber masses so as to partially align individual fibers.

Fiber A and fiber B may be either raw fibers, if composed of a natural material such as wool or cotton, or fibers of a synthetic material, with discrete lengths. Fiber A and fiber B, while positioned adjacently on the first conveyor belt 102, may be randomly aligned and unorganized within their respective masses when entering the carding machine. Upon passing through the carding machine 108, strands of fiber A and fiber B may become at least partially aligned in parallel with the direction of conveyor belt movement. In addition, the strands of each fiber may be at least partially aligned to one another As fiber A and fiber B travel through the carding machine 108, the fibers may be freed from debris, detangled, and combed so that the strands of the fibers are substantially parallel upon exiting the carding machine 108 through an outlet opening. The carded staple fibers exit the carding machine as a first web 112 of staple fibers.

A schematic example of a carding machine 400, which may be the carding machine 108 of FIG. 1, is shown in FIG. 4 without an outer cover. Specifically, FIG. 4 depicts a side view of the carding machine 400. Staple fibers 402, which may be fiber A, fiber B, or both, may be fed into an inlet 403 of the carding machine 400 along a first axis 404 (herein the x-direction). The carding machine may include a first, upstream roller 406 and a second, downstream roller 408. The first and second rollers 406, 408 may be stationary and may rotate in respective fixed positions, each driven by an electric motor. The first roller 406 may be smaller than the second roller 408 and may rotate in a counter-clockwise direction 410. As a result of the static rotation of the first roller 406, staple fibers 402 are pulled into the carding machine along the x-direction. The fibers enter the carding machine at a location under the first roller 406 and pass through a first set of teeth 412 that clean, e.g., remove debris, and detangle the staple fibers 402. The first set of teeth 412 may be relatively large and spaced further apart relative to the teeth spacing of the second roller 408. The size of the first set of teeth 412 may also be larger than a diameter and density of the staple fibers 402.

The detangled staple fibers 402 may be pulled through the second roller 408, also rotating in place in the counter-clockwise direction 410, and adapted with a second set of teeth 414 to arrange the fibers substantially parallel to one another and with the x-direction. The second set of teeth 414 may be smaller and more closely spaced apart than the first set of teeth 412 to further align the strands of the staple fibers 402 after the strands have been combed. A first web of staple fibers 402 may exit the carding machine 400 through an outlet opening 405 of the carding machine 400, e.g., the first web 112 of FIG. 1.

Furthermore, sizes of both the first set of teeth 412 and second set of teeth 414 may be increased or decreased according to dimensions or materials of the staple fibers 402. For example, larger teeth may be used in the carding machine 400 if the staple fibers 402 are thick and coarse. In contrast, smaller teeth may be used if the staple fibers 402 are thin and dense. As a result it may be inefficient to use a single carding machine with specific sizes of the first and second sets of teeth 412, 414 when more than one type of staple fibers, with different thicknesses, are to be carded. As such, multiple carding machines may be employed to increase efficiency, as discussed further below with respect to FIG. 9.

The carding machine 400 of FIG. 4 is shown with two rollers aligned linearly along the direction of travel of the staple fibers. In other examples of the carding machine 400 however, the carding machine 400 may include a different number of rollers with different orientations, e.g., arranged vertically (along the z-direction) above one another or offset from one another. As such, the carding machine 400 as shown in FIG. 4 is a non-limiting example of a carding machine that may be used in the process 100 of FIG. 1 and other examples of the carding machine have been contemplated.

Returning to FIG. 1, fiber A and fiber B may exit the carding machine 108 as the first web 112, travelling in a same direction as in the first zone 110 along the x-direction, with fiber A aligned on the left-hand side and fiber B aligned on the right-hand side of the first web 112 when viewed along the z-direction in the direction of travel, indicated by arrows 106. The first web 112 may be a carded sheet of substantially parallel fibers with strands of fiber A at least partially aligned with strands of fiber B. The first web 112 may pass through a second zone 114 on the first conveyor belt 102 between the carding machine 108 and a cross-lapper 116, still travelling along the x-direction.

In another embodiment, depicted in FIG. 9 as process 900, fiber A may be delivered to a first carding machine 902 by a conveyor belt 904 while fiber B may be delivered to a second, different carding machine 906 by a different conveyor belt 908. The first carding machine 902 and the second carding machine 906 may have different sized teeth, such as the first and second sets of teeth 412, 414 of the carding machine 400 of FIG. 4, adapted to comb and detangle staple fibers of different thicknesses, coarseness, and/or tensile strength. Thus the first carding machine 902 may be configured specifically to card fiber A including a first set of teeth selected based on the physical properties of fiber A, while the second carding machine 906 may be configured specifically to card fiber B, including a second set of teeth selected based on the physical properties of fiber B.

Fiber A and fiber B exit the first carding machine 902 and second carding machine 906 on conveyor belt 904 and conveyor belt 908, respectively, in the second zone 114 of the process 900. Fiber A may form a first carded web 910 and fiber B may form a second carded web 912 in the second zone 114, the first carded web 910 and second carded web 912 converging at the cross-lapper 116. The first carded web 910 and the second carded web 912 may enter the cross-lapper 116 and retain their positions with respect to one another as the webs travel through the cross-lapper 116. During cross-lapping, fiber A and fiber B may be merged into a single web, as detailed with reference to FIG. 1 below.

Returning to FIG. 1, the first web 112 may be cross-lapped and transposed at the cross-lapping machine. Specifically, the first web is concurrently pleated by the cross-lapper 116 and transposed as it emerges from the cross-lapper 116 in a different direction than the direction of the first and second zones 110 and 114. The staple fibers descend from the cross-lapper 116 as indicated by arrow 107 onto a second, moving, conveyor belt 126 that is perpendicular to the first conveyor belt 102 and aligned with the y-direction.

The cross-lapper 116 may be a machine comprising a pleating head 117 adapted with a first roller 118 and a second roller 120, coupled via a belt 122. The first roller 118 may rotate in place but the second roller 120 may rotate while simultaneously shifting translationally, e.g., laterally, between a position distal to the first roller 118 and a position proximate to the first roller 118 along the x-direction, as shown by dashed circle 120a and double-ended arrow 124. The distal position of the first roller 118 may be determined by a maximum extension of the belt 122. As the first web 112 is fed into the cross-lapper 116, the back-and-forth movement between the distal and proximal positions of the second roller 120 along the x-axis pleats the first web 112 onto the second conveyor belt 126. The second conveyor belt 126 moves from the cross-lapper 116 towards a felting machine 130 along the y-direction, offset from the direction of motion of the first conveyor belt 102.

A second, pleated, web 128 is generated at the cross-lapper 116 with pleated folds that are offset from the surface of the second conveyor belt 126 such that fiber B touches the surface of the second conveyor belt 126 while fiber A is not in contact with the surface of the second conveyor belt 126. A degree of pleating, e.g., the number of folds per unit length of the first web 112, may vary based on a frequency of the lateral movement of the second roller 120 between the positions indicated by arrow 124. For example, faster movement of the second roller 120 may result in more pleats per unit length of the first web 112 and a narrower width E, defined along the x-axis, of the second web 128. As another example, slower movement of the second roller 120 may result in fewer pleats per unit length of the first web 112 and a broader width E of the second web 128.

An example of a cross-lapper 500 is shown in FIG. 5. The cross-lapper 500 may be the cross-lapper 116 of FIG. 1 and may include a first conveyor belt 502 that feeds a first web 504 of staple fibers, which may the first web 112 of FIG. 1, into the cross-lapper 500 along a direction indicated by arrow 506. The first web 504 may enter the cross-lapper 500 via the first conveyor belt 502 and come into contact with rollers (not shown) of the cross-lapper 500. The rollers may be positioned below the x-y plane of a surface 503 of the first conveyor belt 502, with respect to the z-direction, in contact with the first conveyor belt 502, e.g., with a bottom surface of the first conveyor belt 502. The rollers may be positioned above a second conveyor belt 510 and spaced away from, e.g., not in contact with, the second conveyor belt 510. The roller of the cross-lapper 500 may be configured similar to the first roller 118 and second roller 120 of FIG. 1, with at least one roller adapted to move translationally along the x-direction. Lateral movement of the roller pleats the first web 504 onto the second conveyor belt 510 to form a second web 508, which may be the second web 128 of FIG. 1. The second web 508 has a layered structure that is oriented differently from the first web 504 due to a perpendicular orientation of the second conveyor belt 510, positioned under the cross-lapper 500 and moving away from the cross-lapper 500, so that when the first web 504 exits the cross-lapper 500 to form the second web 508, the second web 508 travels from the cross-lapper 500 towards a felting machine, e.g., the felting machine 130 of FIG. 1.

The second conveyor belt 510 may be coaxial with the y-direction and may be moving away from the cross-lapper 500 as indicated by arrow 512. The first web 504 emerges downwards, as indicated by arrow 514, from the rollers of the cross-lapper 500 to land on the second conveyor belt 510 as the first web 504 is pleated by the moving roller. Thus the second web 508 comprises a plurality of pleated layers with sides 516 formed from pleated edges of each layer of the plurality of pleated layers. As the plurality of pleated layers are formed and laid onto the second conveyor belt 510, the second conveyor belt 50 is concurrently moving as indicated by arrow 109 so that the second web 508 is transported away from the cross-lapper 500. The perpendicular motion of the second web 508 with respect to the first web 504 results in an offset in the overlapping, e.g. alignment, of each layer of the plurality of pleated layers with respect to adjacent layers, as elaborated further below.

The offset in the pleated layers is shown in FIG. 1 in the second web 128 which is folded into pleated layers onto the second conveyor belt 126 arranged below the cross-lapper 116. The second conveyor belt 126 may move the second web 128 along the y-direction towards a felting machine 130, which is perpendicular to the direction of movement of the first conveyor belt 102. As the first web 112 is pleated to form the second web 128, the movement of the second conveyor belt 126 results in each consecutive layer of the pleated layers of the second web 128 being offset from the previously disposed layer, e.g., not aligned. For example, a top edge of a first layer 132 may be staggered with respect to and closer to the felting machine than a top edge of a second layer 134 that is layered on top of the first layer 132. The second layer 134 is similarly staggered relative to a top edge of a third layer 136 of the pleated layers that is layered on top of the second layer 134. The top edges of the first, second, and third layers 132, 134, 136, may not be parallel with respect to the plane of the second conveyor belt 126 and are angled relative to one another. In some examples, the top edges of the pleated layers may form a zig-zag pattern. Furthermore, as the pleated layers accrue in an offset manner as shown in FIGS. 1 and 5, an angle of each additional pleated layer may decrease relative to the z-direction.

As an example, as viewed along the x direction from the cross-lapper 116 towards the carding machine 108, the planar surface of the first layer 132 of the second web 128 may be co-planar with the plane formed by the x- and z-directions and form a 90 degree angle with respect to the z-direction, as shown by angle α. At a mid-layer 140 that is formed several layers after the first layer 132, however, staggered overlapping of the pleated layers may result in a change in a tilt of a planar surface of the mid-layer 140 relative to the z-direction, as shown by angle β. Angle β may be an angle that is less than 90 degrees, such as between 20 and 60 degrees. A terminal layer 144, which may be a final layer of the pleated layers in the second web 128 and formed several layers after the mid-layer 140 may form an angle Ω, with respect to the z-direction, that is smaller than the angle β of the mid-layer 140. The angle Ω of a planar surface of the terminal layer 144 may be approaching 0 degrees, such as between 0-10 degrees. Thus a plurality of pleated edges 147, e.g., side edges of the second web 128, may become more aligned with the z-direction as the pleated layers accumulate.

An amount by which each successive layer of the pleated layers is offset from a previous layer and a rate of change in angles of the pleated layers relative to the y-direction (and z-direction) may depend on a speed at which the second conveyor belt 126 is moving, as indicated by arrows 109. For example, faster speeds of the second conveyor belt 126 may result in greater offsets between the pleated layers and a slower rate of change in the angles of the pleated layers. The speed of the second conveyor belt 126 relative to a speed of the first conveyor belt 102 may also have a similar effect on the offset of layers and change in angles of the pleated layers. For example, if the second conveyor belt 126 is moving faster than the first conveyor belt 102, the offset between each layer of the pleated layers may increase and the rate of change in angles of the pleated layers may decrease. Conversely, a faster speed along the first conveyor belt 102 relative to the second conveyor belt 126 may result in smaller offsets between the pleated layers and more rapid changes in angles of the pleated layers with respect to the y-direction, e.g., the pleated layers are more closely stacked along the z-direction.

The change in orientation and angling of the pleated layers of the second web 128 results in the width D of the first web 112 transposing to become a height D of the second web 128 at or approaching the terminal layer 144 of the pleated layers of the second web 128. The transposition does not result from direct rearrangement of the second web 128 but instead from a change in the direction of movement of the second web 128. In other words, the process 100 does not include rotating the first web 112 or second web 128 at any point. As such, the fibers of the webs remain aligned with the x-direction from the start to the end of the process 100. However, alignment of the pleated layers of the second web 128 relative to the sheet of the first web 112 become increasingly close to perpendicular to the y-direction as the pleated layers accumulate. The pleated layers of the second web 128 may initially be substantially stacked on top of each other but eventually become aligned with the z-direction and arranged beside one another.

Furthermore, a width E of the second web 128 may be controlled by a pitch of the cross-lapper, the pitch defined as a distance the second roller 120 of the pleating head 117 of the cross-lapper 116 moves back and forth along the x-direction, according to the arrow 124. For example, the width E may be reduced by decreasing the pitch of the second roller 120, where the start and end position of the second roller 120 are adjusted closer to one another. As the second web 128 is formed in a third zone 148 of the process 100, downstream of both the second zone 114 and the first zone 112, the second web 128 may be continuously fed to the felting machine 130, arranged in-line along the y-direction of the second conveyor belt 126. An example of a felting machine 600 is depicted in FIG. 6, which may be used similarly as the felting machine 130 of FIG. 1.

Turning to FIG. 6, a second web 602, which may be the second web 128 of FIG. 1, of staple fibers may enter the felting machine 600 along the direction indicated by arrow 604 at an opening 606 of the felting machine 600 via a conveyor belt 608, which may be the second conveyor belt 126 of FIG. 1. The felting machine 600 may include a block of felting needles 610 that move continuously up and down so that the needles of the block of felting needles 610 may contact and exert a downwards force on the second web 602. The needles may be barbed needles that, when moving up and down through the second web 602, mesh the staple fibers together resulting in an entangling of the fibers through a central region 603 of a height 601 of the second web 602. The central region 603 where the staple fibers may be enmeshed may be a middle zone 603 that includes a portion of a thickness of an upper layer of staple fibers 614, such as fiber A of FIG. 1, and a portion of a thickness of a bottom layer of staple fibers 616, such as fiber B of FIG. 1. The middle zone 603 may be a homogeneous mixture of the two types of staple fibers with a distinct layer of one type of staple fiber above and a distinct layer of another type of staple fiber below. A resulting flat sheet of a nonwoven textile 612 may emerge from the felting machine 600 on the conveyor belt 608 along the y-direction, formed from the compressed upper player of staple fibers 614 over the bottom layer of staple fibers 616, meshed together through the middle zone 603. A schematic diagram 300 showing a change in dimensions of the second web 602 due to the felting machine 600, or 130 of FIG. 1, is shown in FIG. 3 from a perspective view.

The schematic diagram 300 includes a first web 302 of carded staple fibers, which may be the first web 112 of FIG. 1, shown as a flat sheet supported by a conveyor belt 301. Arrows 304 indicate how the first web 302 is pleated by a cross-lapper, e.g., the cross-lapper 116 of FIG. 1 and 500 of FIG. 5, forming a pleated and layered second web 306, which may be the second web 128 of FIG. 1 or 602 of FIG. 6. A middle zone between two different types of staple fibers in the second web 306 is shown by dashed area 308. As the second web 306 passes through a felting machine, e.g., the felting machine 130 of FIG. 1 and 600 of FIG. 2, felting needles press downwards, as indicated by arrows 310, intertwining the staple fibers of the second web 306. The second web 306 is flattened into a nonwoven textile 312 with the different types of staple fibers stacked on top of one another along the z-direction. Although fibers from the two different types of staple fibers may be intermingled across the middle zone, e.g., dashed area 308, to bond the nonwoven textile 312 into a unitary fabric, the layers formed from the two different types of staple fibers may remain largely intact and distinct, also shown by a nonwoven textile 150 of FIG. 1.

Returning to FIG. 1, a height H, or thickness H, of the nonwoven textile 150 may be greatly reduced compared to the height D of the second web 128 after passing through the felting machine 130 due to downward forces exerted on the second web 128 by the felting needles, e.g., the block of felting needles 610 of FIG. 6. The nonwoven textile 150 may have an upper layer 152 formed from fiber A and a bottom layer 154 formed from fiber B, similar to the vertical arrangement of fiber A and fiber B in the second web 128. The upper layer 152 and bottom layer 154 may form distinct, segregated zones of the nonwoven textile 150, with different physical properties above and below a middle zone 153, which may be similar to the middle zone indicated by dashed area 308 of FIG. 3. Along the middle zone 153, strands from fiber A and fiber B may be mixed, forming a thin, relatively homogeneous layer. Thicknesses of the upper layer 152 and bottom layer 154, defined along the z-direction and separated by the middle zone 153, may be substantially equal due to substantially equal contributions to the width D from each of fiber A and fiber B in the first zone 110 of the process 100. However, a thickness of each zone (e.g., layer) of the nonwoven textile 150, may be controlled by a division of the width D between fiber A and fiber B in the first zone 110. For example, fiber A may comprise two-thirds of the width D in the first zone 110 on the first conveyor belt 102 and fiber B may comprise one-third of the width D. This may result in the upper layer 152 of the nonwoven textile 150 having a thickness above the middle zone 153 that is double the thickness of the bottom layer 154 below the middle zone 153. Thus overall physical properties of the nonwoven textile 150 provided by individual characteristics of each layer, or zone, may be adjusted as desired by controlling the thicknesses of each zone.

In this way, nonwoven textiles with zonal properties, e.g. distinct layers of staple fibers with different physical properties, may be generated via the process 100 depicted in FIG. 1. The staple fiber layers may be maintained distinct even though the zones are combined into a continuous sheet of fabric by changing the orientation of the second web relative to the first web and pleating the second web onto a continuously moving conveyor belt. Further, the textile can be created via a single in-line production process, resulting in a reduced dependency for post processing steps which may augment time and costs.

Methods for generating a nonwoven textile may be further adapted to include a continuous filament. The filament may be a yarn, formed from a natural or synthetic fiber, of indeterminate length that may be incorporated into a structure of the nonwoven textile by processes described below. By including the filament in the nonwoven textile, the textile may be endowed with a desired color effect or pattern, e.g., the filament may be a different color than the staple fiber(s) forming the textile, the filament may provide a different physical property such as increased tensile strength, or the filament may provide a different texture than the staple fiber(s).

As elaborated below, additional zonal properties may be created by working with fibers and continuous filament of different melting points via selective heat application. For example, the continuous filament used may be a low melt polymer, incorporated into the middle zone of the textile. By applying heat selectively to some regions of the textile, and not others, the positioning of the low melt polymer may be leveraged to generate textile zones that are stiffer than other zones. In addition, a curvature of the textile may be varied. In one example, the variation in physical properties may be leveraged when using the textile in various manufacturing applications, such as during apparel or footwear manufacture. This may reduce processing steps, improving manufacturing efficiency and throughput.

A process 200 for forming a nonwoven textile incorporating a filament is illustrated in FIG. 2. The process 200 may be substantially the same as the process 100 of FIG. 1. Elements in common with process 100 of FIG. 1 are similarly numbered and will not be re-introduced. The staple fiber bin 202 of the process 200 is shown with a single staple fiber, fiber B, for simplicity. In other examples, however, the staple fiber bin 202 may comprise two types of staple fibers, such as staple fiber bin 104 of FIG. 1 or more than two type of staple fibers. Furthermore, other examples may include different types of staple fibers carded through different carding machines, as shown in FIG. 9, more than one filament and/or more than one type of filament incorporated into the nonwoven textile.

Fiber B may be transferred from the staple fiber bin 104 to the first conveyor belt 102 and arranged on a surface of the first conveyor belt 102 that is co-planar with a plane formed by the x- and y-directions. A mass of fiber B on the first conveyor belt 102, where the strands of fiber B may be tangled and randomly oriented, may define the first zone 110 of the process 200. The first conveyor belt 102, moving along the direction indicated by arrows 106, transports fiber B to the inlet opening of the carding machine 108 where fiber B is processed by the carding machine (e.g., cleaned and detangled). Fiber B emerges through the outlet opening of the carding machine 108 with the strands of fiber B substantially aligned along the x-direction, forming a second web 214 in the second zone 114 of process 200.

A filament 204, or yarn 204, may be wound around and stored on a bobbin 206. The yarn 204 may be fed onto the first conveyor belt 102 in the second zone 114, as indicated by arrow 208, so that the yarn 204 is aligned with the x-direction on the first conveyor belt 102. The cross-lapper 116 may have a threader 210 protruding from an inlet side, e.g., a side where fibers enter the carding machine 108, above the first conveyor belt 102 through which the yarn 204 may be threaded. The threader 210 may have a structure similar to a comb, with a plurality of teeth arranged side-by-side along the y-direction. The yarn 204 may be threaded between a region of the plurality of teeth which guides a position of the yarn 204 and maintains the alignment of the yarn 204 along the moving first conveyor belt 102 amongst the strands of fiber B as the yarn 204 is fed to the cross-lapper 116. For example, if the yarn 204 is guided between two centrally positioned teeth of the plurality of teeth of the threader 210, the yarn is maintained in a central position of along a width F of the first web 212 in the first zone 110. In one example, a spacing of the teeth of the threader 210 may be selected based on a thickness, gauge, coarseness, or other physical properties of the continuous filament yarn 204 being threaded.

It will be appreciated that the process 200 of FIG. 2 is a non-limiting example of how a filament may be incorporated into a nonwoven textile. Other examples may include adding more than one yarn and/or more than one type of yarn, similarly fed through the threader 210, onto the first web 212, with the one or more yarns spaced apart along the y-direction, evenly spaced apart or biased towards one side. For example, a first yarn may be arranged mid-way between along a width F of the first web 212 while a second yarn may be added to the first web between the first yarn and a left side of the first web 212, when viewing the first web 212 along the x-direction from the carding machine 108 to the cross-lapper 116. In such an instance, a resulting nonwoven textile may have the second yarn incorporated into an upper layer of the textile.

The first web 212 entering the cross-lapper 116 on the first conveyor belt 102 may comprise fiber B aligned along the x-direction with the yarn 204 running along a mid-point of the width F of the first web 212. In examples where two types of staple fibers are arranged equally on the conveyor belt 102, similar to process 100 of FIG. 1, each type of staple fiber may constitute equal portions of the width F, e.g., each staple fiber mass is as wide as half of the width F in the first zone 110. Alternatively, they may have unequal widths, based on the desired properties of the final textile. As such, the yarn 204 may be positioned in the middle of the two types of carded staple fibers in the first web 212 and configured as a divider between the two types of staple fibers.

The first web 212 may pass through the cross-lapper 116 to be pleated onto the moving second conveyor belt 126 in the third zone 148, along directions indicated by arrows 107 and 109, the second conveyor belt 126 is perpendicular to the first conveyor belt 102, as described in the process 100 of FIG. 1. The second web 214 may be formed from the pleating of the first web 212. Pleated layers of the second web 214 are similarly angled as the pleated layers of the second web 128 of FIG. 1 and the yarn 204 may be disposed across a width G of the second web 214, along the x-direction, at a mid-point of the height F (formerly the width F of the first web 212) of the second web 214.

The staple fibers above the yarn 204 may be intertwined and meshed with the staple fibers below the yarn 204, which may be the same, as shown in FIG. 2, or different types of staple fibers, by the felting machine 130. The staple fibers above the yarn 204 may form an upper layer, or zone, 216 of a nonwoven textile 218 generated by the felting machine 130 while the staple fibers below the yarn 204 may form a bottom layer, or zone, 220 of the nonwoven textile 218. The staple fibers of the upper and bottom layers 216, 220 may be enmeshed within a merging region 219 between the two zones, where the yarn 204 is arranged.

The yarn 204 may form a mid-layer 222 in the nonwoven textile 218 that may be co-planar with the x-y plane. The mid-layer 222 has a thickness, defined along the z-direction that is less than thicknesses of either the upper layer 216 or the bottom layer 220 of the nonwoven textile 218. The yarn 204 may be disposed in a sinuous zig-zag pattern, when viewed from along the z-direction that intersects with sides 224 of the nonwoven textile 218. The pattern may traverse the width G of the nonwoven textile 218 as a result of the pleating of the first web 212 to form the second web 214. As such, at least some portions of the yarn 204 in the mid-layer 222 may be aligned with the stable fibers of the upper and bottom layers 216, 220 along the width G of the nonwoven textile 218 and other portions of the yarn 204 may be unaligned with the staple fibers.

In the process 200, the mid-layer 222, comprising the yarn 204, may be embedded halfway through a height, or thickness, J of the nonwoven textile 218, which is greatly reduced relative to the height F of the second web 214, the embedding due to the central arrangement of the yarn 204 in the first zone 110 of the process 200. The relative positioning of the mid-layer 222 within the thickness J of the nonwoven textile 218 may be adjusted to achieve a desired placement of the mid-layer 222 as well as thicknesses of the upper and bottom layers 216 and 220. In one example, where the yarn 204 or continuous filament includes a low melt polymer, a position of the middle layer may be adjusted to provide a specific zonal property to the layer, such as a desired degree of stiffness, pliability, rigidity, or curvature. For example, post processing heat treatment to selective locations of the nonwoven textile 218 may enable the yarn 204 in the middle layer of the textile 218 to be "activated", enabling the textile to be molded into a desired shape. In addition, the pattern generated by the yarn 204 in the mid-layer 222 may affect the properties of the mid-layer 222, and thereby the nonwoven textile 218.

For example, if the yarn 204 is arranged further to the left-hand side on the first conveyor belt 102, when viewed along the x-direction from the carding machine 108 towards the cross-lapper 116, the mid-layer 222 in the nonwoven textile 218 may be closer to a top surface 226 than a bottom surface 228 of the nonwoven textile 218. In instances where a nonwoven textile is formed from two different types of staple fibers, as in the process 100 of FIG. 1, each contributing to half of the width D of the staple fibers across the conveyor belt 102 in the first zone 110 of FIG. 1, the yarn 204 may be positioned between the masses of fiber A and fiber B on the conveyor belt 102. In the resulting nonwoven textile 150 the mid-layer 222 of FIG. 2, comprising the yarn 204, may divide the upper layer 152 of fiber A from the bottom layer 154 of fiber B, along a mid-point of the thickness H of the nonwoven textile 150.

The embedding of the yarn 204 within the thickness H of the nonwoven textile 150 may lend the nonwoven textile 150 desired properties depending on a material from which the yarn 204 is formed. As an example, the yarn 204 may have a higher degree of elasticity than fiber B, thus forming a more elastic mid-layer 222 within a middle zone of the thickness H of the nonwoven textile 150. Increasing or decreasing a diameter or thickness of the yarn 204 may increase or decrease effects of the yarn 204 on physical properties of the nonwoven textile 150. As described earlier, a thermal property of the yarn, such as when the yarn is made of a low melt polymer, may also affect the stiffness and curvature of the textile. For example, selected heat application can be used with the low melt polymer to impart specific regions of the textile with a desired degree of stiffness and/or a desired degree of curvature. Furthermore, if a more elastic upper or lower portion of the nonwoven textile 150 is demanded, the yarn 204 may be biased towards the left or towards the right in the first zone 110 of the process 200 of FIG. 2 along the width F of the mass of fiber B. For example, in the first zone 110 of the process 100 of FIG. 1, the yarn 204 may be aligned within the width of the mass of fiber A so that a mid-layer of the yarn 204 is arranged within a thickness of the upper layer 152, formed of fiber A, and not in the merging region between the upper layer 152 and the bottom layer 154 of the nonwoven textile 150. As a result, the yarn 204 of FIG. 2 may form the mid-layer 222 embedded within the upper layer 152 or the bottom layer 154 of the nonwoven textile 150 of FIG. 1, instead of being in-between the layers.

Other properties may be provided to the nonwoven textile 150 from the yarn 204 by selecting a type of yarn to form the mid-layer 222. The yarn 204 may be of a material that reinforces a tensile strength of the nonwoven textile 150, or affords a higher rigidity. Alternatively or additionally, the yarn 204 may create a desirable visual pattern within the nonwoven textile 150. The pattern may also affect the rigidity of the textile, such as by rendering the middle layer stiffer than the upper or lower layer.

By feeding a filament, such as the yarn 204, on to a conveyor belt, and adjusting an alignment of the filament with staple fibers, followed by carding, pleating, and felting the fibers as shown in the process 200, a nonwoven textile with an embedded layer of the filament may be fabricated. The nonwoven textile may comprise one or more types of staple fibers and the filament layer may be arranged between the types of staple fibers or inserted within a thickness of a layer formed by one type of staple fiber. Incorporation of the filament may provide the nonwoven textile with a desired color or textile pattern, e.g. color contrast if the filament has a different color than the staple fiber(s). Alternatively, incorporation of the filament may provide a material property, such as elasticity, strength, or texture.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Textiles are used in a variety of products for personal and industrial use. For example, textiles may be used in articles of apparel, footwear, luggage, automotive applications, and medical applications. The products may include textile elements that are joined through stitching or adhesive bonding. Each textile may be manufactured from one or more different types of fibers and filaments. One class of textiles are woven textiles that are generated via weaving or interlooping (e.g., knitting). Another class of textiles are nonwoven textiles that are generated by joining different types of fibers and filaments, such as via bonding.

Nonwoven textiles may be created with different zonal properties. For example, based on the nature and intended use of the product including the nonwoven textile, as well as the location of the textile in the product, a different property may be desired on a top surface of the textile versus a back surface of the textile. As one example, it may be desirable for a top surface of the textile to be water resistant and a bottom surface of the textile to be able to rapidly wick water. As another example, it may be desirable for a top surface to be abrasion resistant and a bottom surface of the textile to be stretchable. In order to impart the different properties to the different zones of the textile, webs of different types of fibers and filaments that correspond to the desired properties are joined via fusing, interlocking, thermocoupling, or adhesion. However, such steps add time and expense in textile manufacturing. In particular, separate webs for each type of fiber may be generated first, followed by combination of the separate webs in an off-line process. There may also be additional delays and costs in transporting, stocking, cutting, and joining the different fibers and filaments when creating the webs.

In one example, the above issues may be at least partly addressed by a method of joining two or more different types of staple fibers such that a nonwoven textile with different zonal properties can be created without the need for off-line bonding of the fibers. One example method includes generating a web including staple fibers of a first type and a second type at least partially aligned to each other; and pleating the web along a first axis while moving the pleated web along a second axis, offset from the first axis.

As an example, an assembly line for manufacturing a nonwoven textile may include a carding machine, a cross-lapping machine, and a felting machine, each machine connected to the next via a conveyor belt. Staple fibers of two or more types (such as a first natural staple fiber and a second synthetic staple fiber) may be fed into the carding machine along the conveyor belt. An arrangement, including a relative orientation of the fibers as they enter the carding machine, may be selected based on the desired zonal properties of the final nonwoven textile. As an example, the staple fibers may be inserted in a left-to-right arrangement with a first type of fibers destined for the top surface of the textile biased towards the left side and a second type of fibers destined for the bottom surface biased towards the right side. The staple fibers are then carded at the carding machine to generate a web of detangled and partially aligned staple fibers. The web is then fed into a cross-lapping machine which pleats and transposes the web. Specifically, the web is pleated onto a conveyor belt which moves from the cross-lapping machine to the felting machine in a direction offset from the direction in which the web was received at the cross-lapping machine. As a result, a pleated web is generated where the pleat folds are offset from the surface of the conveyor belt such that the region of the pleated web having the second type of staple fibers touch the surface of the conveyor belt, and the region of the pleated web having the first type of staple fibers are in non-contact with the surface of the conveyor belt. The offset pleated web then enters a felting machine where the textile is felted via felting needles creating a nonwoven textile with a top surface of the first type of fibers, a bottom surface of the second type of fibers, and an intermediate zone wherein fibers of the first and second type are intertwined via the action of the felting needles.

In this way, a nonwoven textile with different zonal properties can be created without the need for adhesives, bonding, or other chemical joining methods. By concurrently pleating and transposing a web of carded staple fibers of different types, staple fibers of a first type can be felted to staple fibers of a second type to create a nonwoven textile with distinct properties in distinct zones. By varying the nature and density of the staple fibers in each of the zones, textile properties such as tensile strength and elasticity can be varied. By processing the fibers via carding, cross-lapping, and felting, the textile can be created as part of an assembly line, reduce the cost and complexity of manufacturing the nonwoven textile. Example routines for generating the nonwoven textile are described below with respect to FIGS. 7 and 8.

Figure 7:
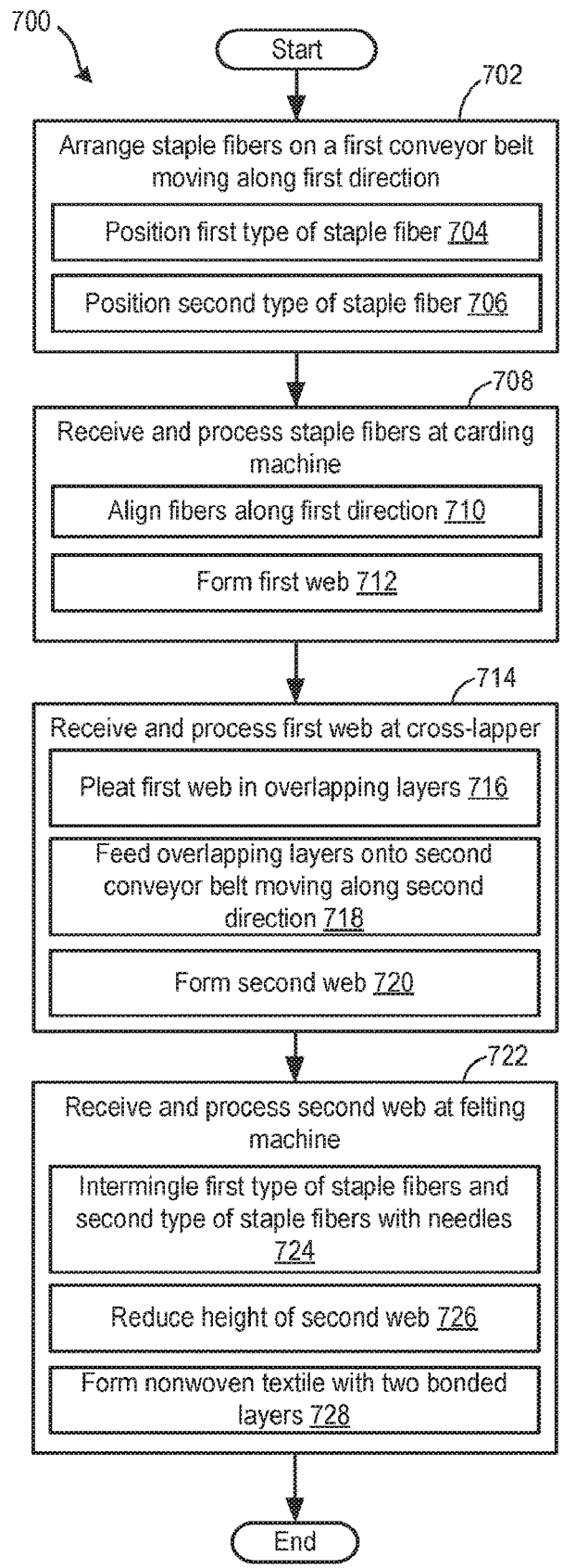
FIG. 7 is an example routine for forming a multi-layered nonwoven textile, each layer comprising a type of staple fiber with distinct properties.

Turning now to FIG. 7, a method 700 for generating a nonwoven textile incorporating a first staple fiber and a second staple fiber, the first and second staple fibers having different physical properties, is illustrated. Method 700 may be used to manufacture a nonwoven textile having two distinct zones with distinct zonal properties, such as the nonwoven textile 150 of FIG. 1. However, in other examples, the method 700 may be used to construct other nonwoven textiles with a single type of staple fiber or more than two different types of staple fibers. As previously discussed, the nonwoven textile may be included in apparel, footwear, in medical supplies, and various types of products.

At 702, the method includes arranging staple fibers on a first conveyor belt, such as the first conveyor belt 102 of FIG. 1 that is moving along a first axis. Arranging the staple fibers may comprise positioning a first staple fiber, which may be a first type of staple fiber, on the first conveyor belt at 704 and additionally positioning a second staple fiber, which may be a second type of staple fiber, on the conveyor belt at 706. The first and second types of staple fibers may be placed on top of the first conveyor belt so that the masses of both types of staple fibers are co-planar and adjacent to one another along a direction perpendicular to the first axis. The fibers may be added to the first conveyor belt manually or by an automated sorting device.

The first and second types of staple fibers are received and processed at a carding machine at 708, such as the carding machine 108 of FIG. 1. Processing the staple fibers at the carding machine may include detangling the first and second types of staple fibers, cleaning the fibers, and aligning the fibers with the first axis at 710. Processing the staple fibers at the carding machine may also include forming a first web, e.g., the first web 112 of FIG. 1, at 712 that incorporates both the carded first and second types of staple fibers with the two types of staple fibers at least partially aligned to each other.

At 714, the method includes receiving and processing the first web at a cross-lapper, such as the cross-lapper 116 of FIG. 1. Processing the first web may comprise pleating the first web into overlapping layers at 716. The cross-lapper has a first roller that rotates in place and a second roller that rotates while moving translationally back and forth. The movement of the second roller festoons the first web into pleated, overlapping layers that are simultaneously fed onto a second conveyor belt that is moving along a second axis perpendicular to the first axis at 718. The movement of the second conveyor belt as the first web is pleated onto the second conveyor belt results in each newly pleated layer being offset from the previous pleated layer.

At least a portion of bottom faces of a first few of the pleated layers is in contact with the second conveyor belt. As the pleated layers accumulate, the layers become increasingly closer to perpendicular to the x-y plane of the second conveyor belt and lesser portions of the bottom faces of the pleated layers contact the second conveyor belt, gradually decreasing a surface area of contact to bottom edges of the pleated layers with the second conveyor belt. The bottom edges of the pleated layers comprise staple fibers aligned on the right-hand side of the first conveyor belt. Upper portions and upper edges of the pleated layers comprise staple fibers aligned on the left-hand side of the first conveyor belt that do not contact the second conveyor belt.

Processing the first web at the cross-lapper also includes forming a second web, such as the second web 128 of FIG. 1, at 720 that is generated at an angle offset from the first direction of feeding the first web. The angle may be a right angle or an acute angle. As the pleated layers of the second web become more vertical, the stratifying of the second web changes an orientation of the staple fibers from a left-to-right orientation to a top-to-bottom orientation. The second web comprises the pleated layers of the staple fibers with the first type of staple fibers aligned with the second type of staple fibers across a width of the second web, with the first type of staple fibers stacked above the second type of staple fibers.

At 722, a felting machine, such as the felting machine 130 of FIG. 1, processes the second web in-line with the second axis of the second conveyor belt. The method, at 724, includes entangling and interlocking the first type of staple fibers with the second type of staple fibers in a merging zone between the two types of staple fibers using needles, such as the block of felting needles 610 of FIG. 6. At 726, the height of the second web is reduced due to a downward force exerted on the second web by the needles of the felting machine. The second web is felted into a nonwoven textile at 728 that includes two distinct layers, or zones, that are bonded via meshing of the first and second types of staple fibers.

Figure 8:
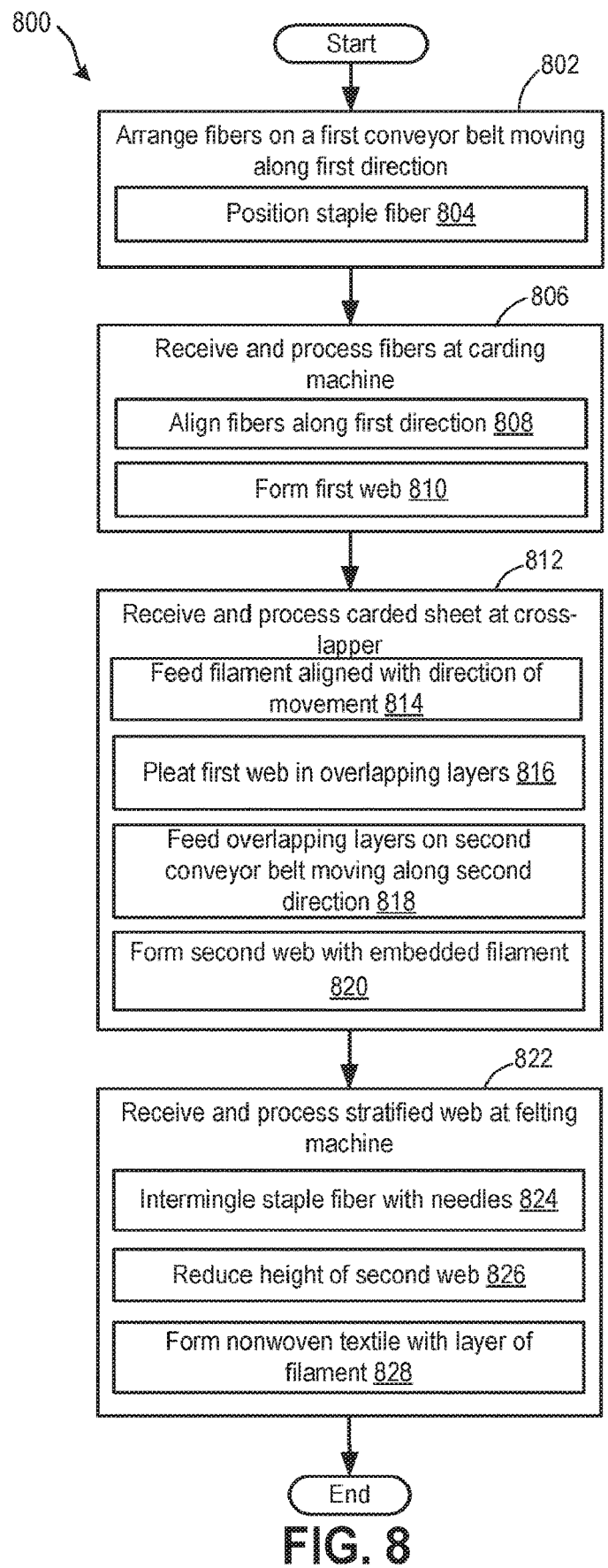
FIG. 8 is an example routine for forming a nonwoven textile from a staple fiber that is reinforced with a filament.
Figure 9:
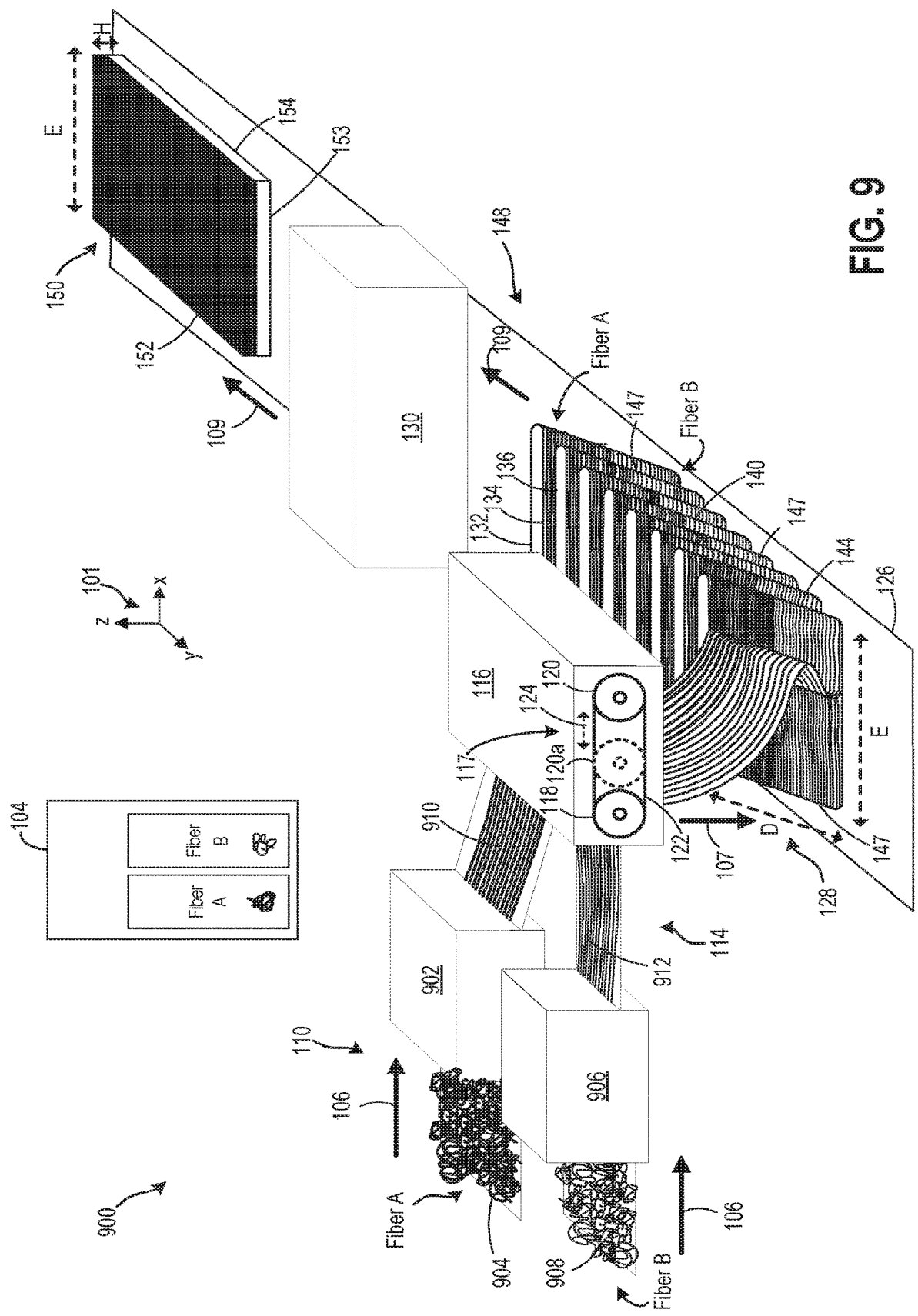
FIG. 9 shows a process for forming a nonwoven textile with zonal properties by incorporation of at least two types of staple fibers into the textile that are carded separately.

A similar process is shown in FIG. 8 by a method 800 for generating a nonwoven textile with a layer formed from a filament, such as the yarn 204 of FIG. 2. The filament layer may be embedded within a layer formed from a staple fiber or between layers of one or more types of staple fibers. While method 800 describes a routine for producing the nonwoven textile with one filament layer inserted between two layers of a single type of staple fiber, method 800 may be applied to forming a nonwoven textile with one or more layers of filament embedded within one staple fiber layer or between layers of two or more different types of staple fibers. Numerous combinations of filament layers and staple fiber layers within the nonwoven textile may be envisioned.

At 802, the method includes arranging a staple fiber on a conveyor belt, such as the conveyor belt 102 of FIG. 2 that is moving along a first axis. Arranging the staple fiber may comprise positioning the staple fiber on the first conveyor belt at 804. The fibers may be added to the first conveyor belt manually or by an automated sorting device.

The staple fiber and filament are received and processed at a carding machine at 806, such as the carding machine 108 of FIG. 2. Processing the staple fiber and filament may include detangling the staple fiber, cleaning the fiber, and aligning the staple fiber with the first axis at 808. Receiving the staple fibers may also include forming a first web, e.g., the first web 212 of FIG. 2, at 810 that at least partially aligns the strands of the carded staple fiber.

At 812, the method includes receiving and processing the first web at a cross-lapper, such as the cross-lapper 116 of FIG. 2. Receiving the first web may include feeding a filament from a bobbin, such as the bobbin 206 of FIG. 2, onto the conveyor belt and on top of the staple fiber at 814. The filament may be guided onto the conveyor belt by a threader, such as threader 210 of FIG. 2, so that the filament is aligned with the first axis. Processing the first web may comprise pleating the first web into overlapping layers at 816. The cross-lapper has a first roller that rotates in place and a second roller that rotates while moving translationally back and forth. The movement of the second roller festoons the first web into pleated, overlapping layers that are simultaneously fed onto a second conveyor belt that is moving along a second axis perpendicular to the first axis at 818. The movement of the second conveyor belt as the first web is pleated onto the second conveyor belt results in each newly pleated layer being offset from the previous pleated layer.

At least a portion of bottom faces of a first few of the pleated layers is in contact with the second conveyor belt. As the pleated layers accumulate, the layers become increasingly closer to perpendicular to the x-y plane of the second conveyor belt and lesser portions of the bottom faces of the pleated layers contact the second conveyor belt, gradually decreasing the surface area of contact to bottom edges of the pleated layers with the second conveyor belt. The bottom edges of the pleated layers comprise staple fibers aligned on the right-hand side of the first conveyor belt. Upper portions and upper edges of the pleated layers comprise staple fibers aligned on the left-hand side of the first conveyor belt that do not contact the second conveyor belt.

Processing the first web at the cross-lapper also includes forming a second web, such as the second web 214 of FIG. 2, at 820, that is generated at an angle offset from the first direction of feeding the first web. The angle may be a right angle or an acute angle. As the pleated layers of the second web become more vertical, the stratifying of the second web changes an orientation of the staple fibers from a left-to-right orientation to a top-to-bottom orientation. The filament is also aligned with the staple fiber across the width of the second web and positioned at a mid-point along the height of the second web. For example, the mid-point may be half of the of the height, two-thirds of the height, a quarter of the height, etc., depending on where along a width of the conveyor belt and staple fiber the filament was initially fed (e.g., at 802).

At 822, a felting machine, such as the felting machine 130 of FIG. 2, receives the second web in-line with the second axis of the second conveyor belt. The method, at 824, includes entangling and interlocking a layer of staple fiber above the filament with a layer of staple fiber below the filament, in a merging zone between the two layers. The intertwining of the staple fiber of the layers may be performed by needles, such as the block of felting needles 610 of FIG. 6. At 826, the height of the second web is reduced due to a downward force exerted on the second web by the needles of the felting machine. The second web is felted into a nonwoven textile at 828 that includes an upper layer of staple fiber and a bottom layer of staple fiber that merge in a region between the upper and bottom layers where a filament layer is disposed. The filament layer may be thinner than both of the upper and bottom layers and may form a sinuous pattern, back and forth across a width of the nonwoven textile. The upper and bottom layers may be equal or different in thickness, depending on the positioning of the filament layer.

In this way a nonwoven textile with layered zonal properties may be generated via a single continuous process. The nonwoven textile may be formed from two or more types of staple fibers, each type of staple fiber having a different physical property. The nonwoven textile may be created by feeding staple fibers, of different types, as well as one or more continuous filaments concurrently into a line production, simplifying textile manufacture. The processing described herein allows the different types of fibers to remain as distinct, yet attached, zones, each with distinct zonal properties. By simultaneously integrating different types of staple fibers into discrete zones, the nonwoven textile may be formed without additional steps beyond the in-line operations shown. A manufacturing throughput may be increased while reducing production costs, and with fewer off-line steps, thus providing an improved method for endowing a nonwoven textile with zonal properties.

As one embodiment, a nonwoven textile includes a first fiber zone and a second fiber zone, the first fiber zone including a first staple fiber and the second fiber zone including a second staple fiber, wherein the first staple fiber of the first fiber zone is at least partially aligned with the second staple fiber of the second fiber zone along a length or width of the textile, the first fiber zone positioned above the second fiber zone. In a first example of the textile, the first fiber zone defines a first surface of the textile and the second fiber zone defines a second, opposite surface of the textile and wherein the first staple fiber of the first fiber zone is a different type of staple fiber than the second staple fiber of the second fiber zone. A second example of the textile optionally includes the first example, and further includes, wherein the first fiber zone and the second fiber zone are adjacent to one another, the textile further comprising a merging zone intermediate to the first and second fiber zones, the merging zone including staple fibers of the first and second fiber zones. A third example of the textile optionally includes one or more of the first and second examples, and further includes, wherein in the merging zone, the first staple fiber of the first fiber zone is entangled with the second staple fiber of the second fiber zone along a depth-wise direction, the depth-wise direction perpendicular to a lengthwise direction of the textile. A fourth example of the textile optionally includes one or more of the first through third examples, and further includes, wherein the first fiber zone is adhered to the second fiber zone via mechanical entanglement of the different types of staple fibers at the merging zone. A fifth example of the textile optionally includes one or more of the first through fourth examples, and further includes, wherein the different types of staple fibers include one or more of staple fibers of different color, different material, and different melting points. A sixth example of the textile optionally includes one or more of the first through fifth examples, and further includes, wherein the first fiber zone includes carded first staple fibers oriented in a lengthwise direction of the textile, and wherein the second fiber zone includes carded second staple fibers, of a different type from the first staple fibers, oriented in the lengthwise direction of the textile. A seventh example of the textile optionally includes one or more of the first through sixth examples, and further includes, wherein a thickness of the first fiber zone is different from a thickness of the second fiber zone. An eighth example of the textile optionally includes one or more of the first through seventh examples, and further includes, wherein the first fiber zone is felted to the second fiber zone along a depth of the textile. A ninth example of the textile optionally includes one or more of the first through eighth examples, and further includes, wherein the textile is used in one or more of an article of apparel and an article of footwear.

In another embodiment, a nonwoven textile includes a first zone of carded, horizontally aligned first staple fibers, a second zone of carded, horizontally aligned second staple fibers, and a third zone intermediate the first and second zone, wherein the first, second, and third zone are vertically aligned relative to one another. In a first example of the textile, the first staple fibers of the first zone are of a first type and the second staple fibers of the second zone are of a second type, the second type differing from the first type in at least one physical property and wherein the staple fibers of the first type are enmeshed with the staple fibers of the second type in the third zone and the first, second, and third zones are vertically felted to one another. A second example of the textile optionally includes the first example, and further includes, wherein the first zone is positioned on top of the second zone along a vertical axis perpendicular to horizontally aligned first and second staple fibers and the first zone defines a top surface of the textile and the second zone defines a bottom surface of the textile and wherein the first staple fibers are vertically pleated in the first zone and the second staple fibers are vertically pleated in the second zone. A third example of the textile optionally includes one or more of the first and second examples, and further includes, a continuous filament substantially aligned to the first staple fibers and the second staple fibers and wherein the continuous filament is vertically pleated in the third zone. A fourth example of the textile optionally includes one or more of the first through third examples, and further includes, wherein the first staple fibers, the second staple fibers, and the continuous filament are of differing physical properties including one or more of differing color, differing material, differing melting temperature, and differing rigidity. In another embodiment, a method includes generating a web including a first staple fiber and second staple fiber at least partially aligned to each other, and pleating the web along a first axis while moving the pleated web along a second axis, offset from the first axis and substantially perpendicular to the first axis. In a first example of the method, generating the web includes carding the first and second staple fibers, along the first axis via a carding machine and wherein pleating the web includes repeatedly pleating via a cross-lapping machine. A second example of the method optionally includes the first example, and further includes, felting the pleated web along the second axis via a felting machine, and continuously feeding the pleated web to the felting machine. A third example of the method optionally includes one or more of the first and second examples, and further includes, wherein the moving includes continuously moving the pleated web from the cross-lapping machine, away from the carding machine, and towards the felting machine, the cross-lapping machine including a pleating head having a first static roller and a second mobile roller, the second mobile roller continuously moving towards and away from the first roller with a frequency, wherein a degree of pleating of the pleated web is based on the frequency. A fourth example of the method optionally includes one or more of the first through third examples, and further includes, inserting a continuous filament into the web via a threading machine, wherein the continuous filament is at least partially aligned with the first and second staple fibers.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A nonwoven textile, comprising:
a first fiber zone and a second fiber zone, the first fiber zone including-a first staple fibers and the second fiber zone including-a second staple fibers, wherein the first staple fibers of the first zone is are at least partially aligned in orientation with the staple fibers of the second zone along a length and/or width of the textile, the first fiber zone positioned in a depth-wise direction above the second fiber zone, wherein the first staple fiber is a different type of staple fiber than the second staple fiber,
a continuous filament at least partially aligned in orientation along the length and/or width with some of the first staple fibers and some of the second staple fibers and incorporated as a distinct layer separate from the first fiber zone and the second fiber zone, the distinct layer defined by the continuous filament being disposed and oriented along the length in a sinuous zig-zag pattern across the width, wherein the continuous filament comprises a low melt polymer having a melting point relatively lower than that of the first staple fiber and the second staple fiber.

2. The textile of claim 1, wherein the different type of staple fiber comprises a different color, different material, different rigidity, and/or different melting point.

3. The textile of claim 1, wherein the first fiber zone defines a first surface of the textile and the second fiber zone defines a second, opposite surface of the textile.

4. The textile of claim 2, wherein the first staple fibers comprise carded first staple fibers, and wherein the second staple fibers comprise carded second staple fibers.

5. The textile of claim 1, wherein the first staple fiber and/or the second staple fiber further differ from the continuous filament by one or more of differing color, differing material, and differing rigidity.

6. The textile of claim 1, wherein a thickness of the first fiber zone is different from a thickness of the second fiber zone.

7. The textile of claim 1, wherein the first fiber zone is felted to the second fiber zone along a depth of the textile.

8. The textile of claim 1, wherein the textile is used in one or more of an article of apparel and an article of footwear.

9. A nonwoven textile, comprising:
a first zone of carded, horizontally aligned first staple fibers;
a second zone of carded, horizontally aligned second staple fibers, wherein the first staple fiber is a different type of staple fiber than the second staple fiber; and
a third zone intermediate the first and second zone, wherein the first, second, and third zone are vertically aligned relative to one another,
wherein the third zone comprises a horizontally aligned continuous filament as a distinct layer, wherein the horizontal alignment is provided by a pleating along a length of the textile in a sinuous zig-zag pattern across a width of the textile, wherein the continuous filament comprises a low melt polymer having a melting point relatively lower than that of the first staple fiber and the second staple fiber.

10. The textile of claim 9, wherein the first zone is positioned on top of the second zone along a vertical perpendicular to the horizontally aligned first and second staple fibers and the first zone defines a top surface of the textile and the second zone defines a bottom surface of the textile.

11. The textile of claim 9, wherein the different type of staple fiber differs in at least one physical property and/or material.

12. The textile of claim 9, wherein the first staple fibers and/or the second staple fibers further differ from the continuous filament by one or more of differing color, differing material, and differing rigidity.

13. The textile of claim 9, wherein the low melt polymer enables post-processing heat treatment to activate the distinct layer.

14. A nonwoven textile, comprising:
a first fiber zone, a second fiber zone, and a continuous filament, the first fiber zone comprising first staple fibers and the second fiber zone comprising second staple fibers,
wherein the continuous filament is incorporated as a distinct layer between the first fiber zone and the second fiber zone, the distinct layer defined by the continuous filament being disposed and oriented along a length of the textile in a sinuous zig-zag pattern across a width of the textile, wherein the continuous filament comprises a low melt polymer having a melting point relatively lower than that of the first staple fiber and the second staple fiber,
wherein at least some of the first staple fibers and some of the second staple fibers are at least partially aligned in orientation with the continuous filament, and wherein the first staple fiber is a different type of staple fiber than the second staple fiber.

15. The textile of claim 14, wherein the first staple fibers comprise carded first staple fibers, and wherein the second staple fibers comprise carded second staple fibers.

16. The textile of claim 14, wherein the first fiber zone defines a first surface of the textile and the second fiber zone defines a second, opposite surface of the textile.

17. The textile of claim 14, wherein the different type of staple fiber comprises a different color, different material, different rigidity, and/or different melting point.

18. The textile of claim 14, wherein the first staple fiber and/or the second staple fiber further differ from the continuous filament by one or more of differing color, differing material, and differing rigidity.

19. The textile of claim 14, wherein the first fiber zone excludes the second staple fiber.

20. The textile of claim 14, wherein the second fiber zone excludes the first staple fiber.

* * * * *

UNITED STATES PATENT AND TRADEMARK OFFICE
CERTIFICATE OF CORRECTION

PATENT NO. : 12,435,454 B2
APPLICATION NO. : 17/671140
DATED : October 7, 2025
INVENTOR(S) : Balwant S. Atwal et al.

Page 1 of 1

It is certified that error appears in the above-identified patent and that said Letters Patent is hereby corrected as shown below:

In the Claims

Under Column no. 21, Claim 1, Line no. 63:
The line reading "zone including-a first staple fibers and the second fiber" should read --zone including first staple fibers and the second fiber--

Under Column no. 21, Claim 1, Line no. 64:
The line reading "zone including-a second staple fibers, wherein the first" should read --zone including second staple fibers, wherein the first--

Under Column no. 21, Claim 1, Line no. 65:
The line reading "staple fibers of the first zone is are at least partially" should read --staple fibers of the first zone are at least partially--

Signed and Sealed this
Thirtieth Day of December, 2025

John A. Squires
*Director of the United States Patent and Trademark Office*